(12) United States Patent
Joos et al.

(10) Patent No.: US 8,200,372 B2
(45) Date of Patent: Jun. 12, 2012

(54) METHODS AND PROCESSES FOR MANAGING DISTRIBUTED RESOURCES IN ELECTRICITY POWER GENERATION AND DISTRIBUTION NETWORKS

(75) Inventors: Geza Joos, Outremont (CA); Khalil El-Arroudi, Outremont (CA); Donald McGillis, Pointe Claire (CA); Reginald Brearley, Pointe Claire (CA)

(73) Assignee: The Royal Institution for the Advancement of Learning/McGill University, Montreal, Quebec ( * ) Notice: Subject to any disclaimer, the term of this patent is extended or adjusted under 35 U.S.C. 154(b) by 538 days.

(21) Appl. No.: 12/415,268

(22) Filed: Mar. 31, 2009

(65) Prior Publication Data

US 2009/0319093 A1    Dec. 24, 2009

Related U.S. Application Data

(60) Provisional application No. 61/064,857, filed on Mar. 31, 2008.

(51) Int. Cl.
*G05D 11/00* (2006.01)

(52) U.S. Cl. ........... 700/292; 700/287; 700/293; 702/59

(58) Field of Classification Search ............... 700/9, 287, 700/292; 702/59, 64; 706/12
See application file for complete search history.

(56) References Cited

U.S. PATENT DOCUMENTS

| | | | | |
|---|---|---|---|---|
| 7,069,116 | B2* | 6/2006 | Kunsman et al. | 700/293 |
| 7,376,491 | B2* | 5/2008 | Walling et al. | 700/292 |
| 7,844,370 | B2* | 11/2010 | Pollack et al. | 700/291 |
| 2008/0039979 | A1* | 2/2008 | Bridges et al. | 700/292 |
| 2009/0066287 | A1* | 3/2009 | Pollack et al. | 320/101 |
| 2010/0185336 | A1* | 7/2010 | Rovnyak et al. | 700/287 |
| 2010/0324844 | A1* | 12/2010 | Marti | 702/61 |
| 2011/0025556 | A1* | 2/2011 | Bridges et al. | 342/357.25 |
| 2011/0166716 | A9* | 7/2011 | Rovnyak et al. | 700/287 |

OTHER PUBLICATIONS

Hou, D.; Fischer, N.; , "Deterministic High-Impedance Fault Detection and Phase Selection on Ungrounded Distribution Systems," Power Systems Conference: Advanced Metering, Protection, Control, Communication, and Distributed Resources, 2006. PS '06 , vol., no., pp. 112-122, Mar. 14-17, 2006.*

El-Arroudi, K.; Joos, G.; Kamwa, I.; McGillis, D.T.; , "Intelligent-Based Approach to Islanding Detection in Distributed Generation," Power Delivery, IEEE Transactions on , vol. 22, No. 2, pp. 828-835, Apr. 2007.*

Yong Sheng; Rovnyak, S.M.; , "Decision tree-based methodology for high impedance fault detection," Power Delivery, IEEE Transactions on , vol. 19, No. 2, pp. 533- 536, Apr. 2004.*

Jun Yin; Liuchen Chang; Diduch, C.; , "Recent developments in islanding detection for distributed power generation," Power Engineering, 2004. LESCOPE-04. 2004 Large Engineering systems Conference on , vol., no., pp. 124-128, Jul. 28-30, 2004.*

* cited by examiner

*Primary Examiner* — Dave Robertson
(74) *Attorney, Agent, or Firm* — Freedman & Associates

(57) ABSTRACT

According to an aspect of the invention a method is provided comprising: providing a model for a predetermined location within an electrical power system having therein distributed resources (DR), the model based on known system conditions, the model indicative of first sensed characteristics of the electrical power system at the predetermined location; sensing at the predetermined location characteristics of the electrical power system corresponding to at least some of the first sensed characteristics; determining a status of the electrical power system network indicative of an islanding event in dependence upon sensing and other than in dependence upon other sensed data sensed remotely from the predetermined location; and, controlling a distributed resource in dependence upon the status.

3 Claims, 24 Drawing Sheets

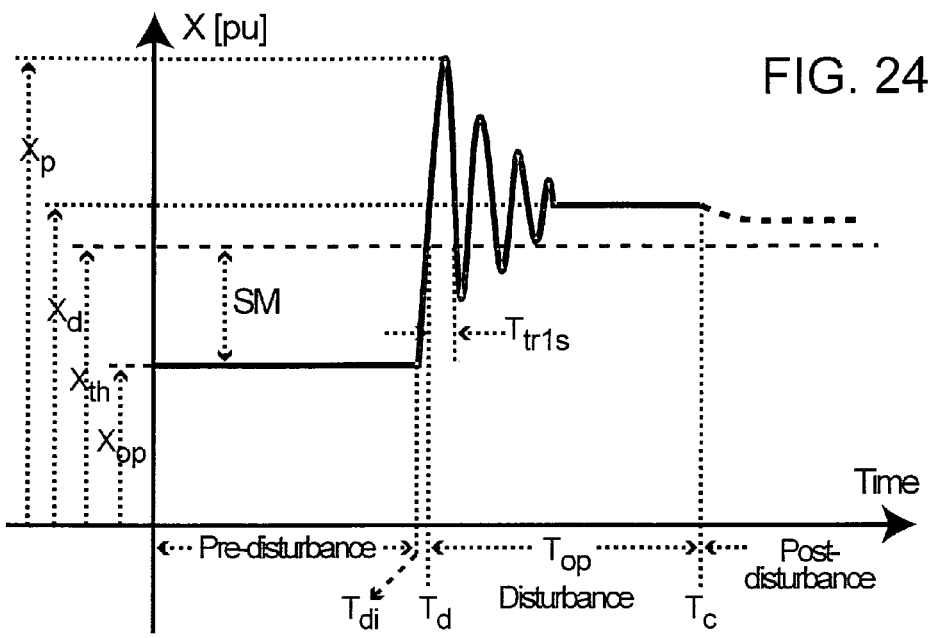
FIG. 24
FIG. 25
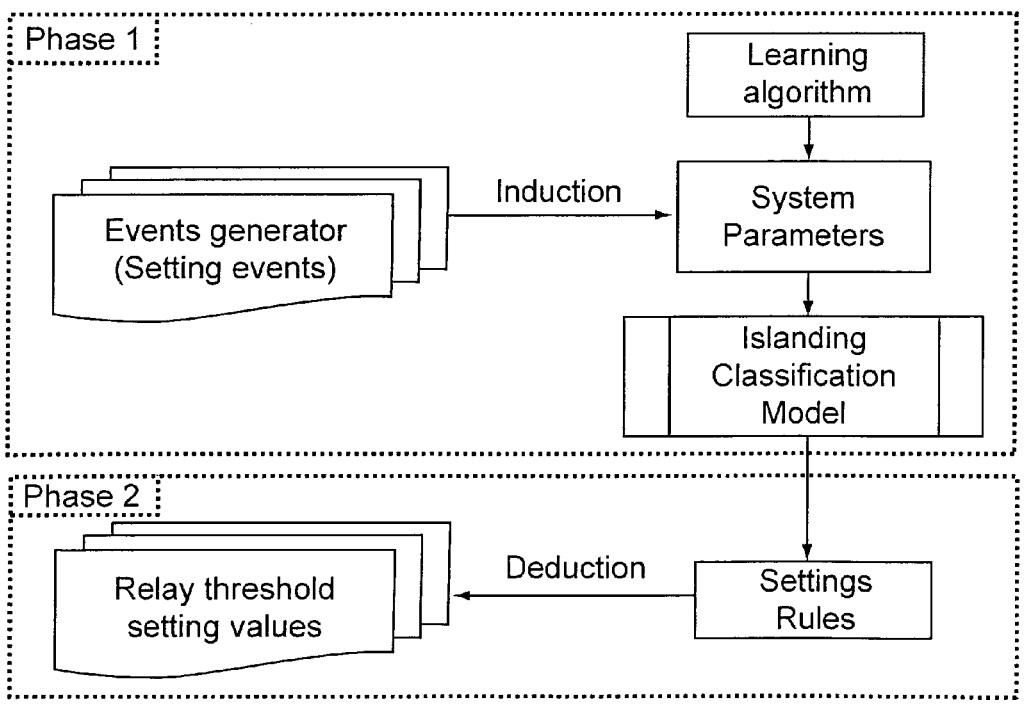

METHODS AND PROCESSES FOR MANAGING DISTRIBUTED RESOURCES IN ELECTRICITY POWER GENERATION AND DISTRIBUTION NETWORKS

FIELD OF THE INVENTION

The invention relates to electric power systems and more particularly to managing distributed generation resources.

BACKGROUND OF THE INVENTION

Distributed generation with its various distributed resource technologies has many advantages when connected with the electric power system (EPS). However, this integration has introduced many issues that should be considered when designing distributed generation. A topic of research is monitoring and security analysis in order to assist Independent System Operators (ISOs) and Regional Transmission Organizations (RTOs) in managing their networks.

The main objectives of monitoring systems are to: a) assist system operators in managing information overload, b) assess dynamic stability and c) provide guidance to operators on how to handle previously unknown situations rapidly. An IEEE task force report discusses past experience of utilities with power system disturbance monitoring and defines requirements of instrumentation for monitoring the data. With the recent advances in real-time systems it is now possible to implement real-time dynamic synchronized data recorders to assess impacts of disturbances over wide. Existing projects provide elegant solutions based on analysis of the data and obviate model parameter construction, as parameters are measured in real-time. However, assessments of existing projects and their responses are determined centrally and, therefore, require sophisticated wide-area measurements and high-speed communication links between the measurement points.

Another of the issues is the islanding of operations and their detection techniques to provide management of the EPS to minimize disruption to customers, and potential damage to the distributed resources.

Islanding is a situation that occurs when part of a network is disconnected from the remainder of EPS but remains energized by a distributed resource (DR). Failure to trip islanded DR can lead to a number of problems for this resource and the connected loads. The current industry practice is to disconnect all DRs immediately after the occurrence of islands. The main concerns associated with such islanded systems include:

- the voltage and frequency provided to the customers in the islanded system can vary significantly if the distributed resources do not provide regulation of voltage and frequency,
- islanding may create a hazard for the utility workers by causing a line to remain energized,
- the distributed resources in the island could be damaged when the island is out-of-phase reclosed to the EPS, and
- islanding may interfere with the manual or automatic restoration of normal service for the neighboring customers.

The criteria of the tripping time for the islanding protection is defined such that the two systems (EPS and DR) should have been successfully separated before any automatic reclosing equipment can attempt to reconnect them when the two networks are out-of-synchronism. The maximum separation time has been specified as 0.5 s. However, the target tripping time of protection algorithms is to be less than 0.125 s as required by some utilities. In general, islanding detection techniques can be categorized into three main groups, namely: passive schemes, active schemes, and communication-based schemes.

First, the passive scheme makes decisions based on the local measurements of voltage and current signals. The algorithms of this scheme include under/over frequency, under/over voltage, rate-of-change of frequency, rate-of-change of power, vector surge and harmonic distortion indices. Next, the active schemes, in these schemes disturbances are injected locally into the system and responses of these disturbances are used to detect islanding conditions. Active schemes include impedance measurement, voltage phase jump, voltage shift, phase shift, frequency shift and harmonic distortion. Finally, the communication schemes are telecommunication devices that are designed to trip DRs when islands are formed. These schemes include power line signaling and transfer trip.

SUMMARY OF EMBODIMENTS OF THE INVENTION

According to the invention there is provided a method comprising: providing a model for a predetermined location within an electrical power system having therein distributed resources (DR), the model based on known system conditions, the model indicative of first sensed characteristics of the electrical power system at the predetermined location; sensing at the predetermined location characteristics of the electrical power system corresponding to at least some of the first sensed characteristics; determining a status of the electrical power system network indicative of an islanding event in dependence upon sensing and other than in dependence upon other sensed data sensed remotely from the predetermined location; and controlling a distributed resource in dependence upon the status.

In accordance with another embodiment of the invention there is provided a method comprising: providing an electrical power network having a known topology and comprising distributed resources therein; sensing at a predetermined location characteristics of the electrical power network; and based only on the characteristics sensed at the predetermined location and data forming a model of the electrical power network as seen by the predetermined location determining an islanding condition at the predetermined location and in response to determining of an islanding condition controlling the distributed resource.

In accordance with another aspect of an embodiment of the invention there is provided a system comprising: a processor having a suitable model for a predetermined location within an electrical power system having therein distributed resources (DR), the model based on known system conditions, the model indicative of first sensed characteristics of the electrical power system at the predetermined location for determining a status of the electrical power system network indicative of an islanding event in dependence upon sensing and other than in dependence upon other sensed data sensed remotely from the predetermined location and for providing a control signal therefrom; a sensor for sensing at the predetermined location characteristics of the electrical power system corresponding to at least some of the first sensed characteristics; and, an actuator for in response to the control signal controlling a distributed resource in dependence upon the status.

In accordance with another embodiment of the invention there is provided a method comprising: providing a model for a predetermined location within an electrical power system having therein distributed resources (DR), the model based on known system conditions, the model indicative of first sensed characteristics of the electrical power system; one of simulating events within the network and implementing events within the network to determine responses of the network to the events; determining from the responses to the events a threshold indicative of a stress level, the threshold for use in determining a stress level within the network; and controlling a distributed resource in dependence upon a decision made in dependence upon the determined threshold.

In accordance with another embodiment of the invention there is provided a system comprising: a model for an electrical power system having therein distributed resources (DR), the model based on known system conditions, the model indicative of first sensed characteristics of the electrical power system, the model formed at least in part by one of simulating events within the network and implementing events within the network to determine responses of the network to the events and determining from the responses to the events a threshold indicative of a stress level, the threshold for use in determining a stress level within the network; and a controller for controlling a distributed resource in dependence upon a decision made in dependence upon the determined threshold.

In accordance with another embodiment of the invention there is provided a method comprising: providing a model for a predetermined location within an electrical power system having therein distributed resources (DR), the model based on known system conditions, the model indicative of first sensed characteristics of the electrical power system; one of simulating events within the network and implementing events within the network to determine responses of the network to the events; determining from the responses to the events a threshold indicative of islanding, the threshold for use in detecting islanding within the network; and controlling a distributed resource in dependence upon a decision made in dependence upon the determined threshold.

In accordance with another embodiment of the invention there is provided a system comprising: providing a model for a predetermined location within an electrical power system having therein distributed resources (DR), the model based on known system conditions, the model indicative of first sensed characteristics of the electrical power system and formed at least in part by one of simulating events within the network and implementing events within the network to determine responses of the network to the events and determining from the responses to the events a threshold indicative of islanding, the threshold for use in detecting islanding within the network; and a controller for controlling a distributed resource in dependence upon a decision made in dependence upon the determined threshold.

In accordance with another embodiment of the invention there is provided a method comprising: providing a model for a predetermined location within an electrical power system, the model based on known system conditions, the model indicative of first sensed characteristics of the electrical power system at the predetermined location; sensing at the predetermined location characteristics of the electrical power system corresponding to at least some of the first sensed characteristics; determining a status of the electrical power system network indicative of a stress level of the network in dependence upon sensing and other than in dependence upon other sensed data sensed remotely from the predetermined location; and providing an indication of the determined stress level.

In accordance with another embodiment of the invention there is provided a system comprising: a model for a predetermined location within an electrical power system, the model based on known system conditions, the model indicative of first sensed characteristics of the electrical power system at the predetermined location; a sensor for sensing at the predetermined location characteristics of the electrical power system corresponding to at least some of the first sensed characteristics; a processor for determining a status of the electrical power system network indicative of a stress level of the network in dependence upon sensing and other than in dependence upon other sensed data sensed remotely from the predetermined location; and an indicator for providing an indication of the determined stress level.

In accordance with another embodiment of the invention there is provided a method comprising: providing a model for a stress level within an electrical power system and relating to known resources within said network, the network, the model based on known system conditions, the model indicative of first sensed characteristics of the electrical power system at predetermined locations; sensing at the predetermined locations characteristics of the electrical power system corresponding to at least some of the first sensed characteristics; determining a status of the electrical power system network indicative of a stress level of the network in dependence upon sensing; and providing an indication of the determined stress level.

In accordance with another embodiment of the invention there is provided a system comprising: a model for a stress level within an electrical power system and relating to known resources within said network, the network, the model based on known system conditions, the model indicative of first sensed characteristics of the electrical power system at predetermined locations; sensors for sensing at the predetermined locations characteristics of the electrical power system corresponding to at least some of the first sensed characteristics; a processor for determining a status of the electrical power system network indicative of a stress level of the network in dependence upon sensing; and an indicator for providing an indication of the determined stress level.

The entire contents of U.S. Provisional Patent Application No. 61/064,857, was filed on Mar. 31, 2008 and is entitled "Methods and Processes Relating to Electricity Power Generation and Distribution Networks," are incorporated herein by reference.

BRIEF DESCRIPTION OF THE DRAWINGS

Exemplary embodiments of the invention will now be described in conjunction with the following drawings, in which:

FIG. 24 shows a typical system parameter under pre-disturbance, disturbance, and post-disturbance states with $X_{th}$ (threshold setting), $X_{op}$ (pre-disturbance quantity), $X_d$ (steady-state disturbance quantity), $X_p$ (peak instantaneous value), SM (safety margin), $T_{trls}$ (first-swing transient duration), $T_{di}$ (disturbance initiation time), $T_d$ (detection time), $T_c$ (disturbance clearing time), and $T_{op}$ (relay time-delay).

FIG. 25 is a simplified diagram of a threshold determination process.

DETAILED DESCRIPTION OF EMBODIMENTS OF THE INVENTION

It is now evident that a device that acts as a local intelligent system-predictor for a location that records the on-line system parameters at the location, detects system stresses and predicts their severity would be advantageous. According to a first embodiment of the invention, an autonomous stress indicator (ASI) is presented for interpreting on-line data being monitored and relating the data to the record of system performance under adverse conditions, which has been recorded off-line. The ASI predicts the performance of the system under stresses. The stresses are evaluated for a selected location termed an area of vulnerability. Deployment of several ASIs in identified areas of vulnerability forms a system of distributed autonomous predictors to alert a system operator of possible system problems or failure and thus allow for early initiation of remedial action.

The record of system performance is formed, for example by simulating a prespecified range of system contingencies to generate patterns, local observations, in areas of vulnerability. The ASIs then compare actual measurements, system parameters at their locations, against generated patterns, from which stress levels of disturbances on areas of vulnerability are predicted. These stress levels are defined in terms of the performance level measures delineated by planning standards and design criteria. As such, these performance level measures are customizable by an RTO to achieve a design objective. For example, the actions or system performance is designed to comply with NERC, WSCC, and/or EDF standards.

System stress is predicted in different time frames in terms of four symptoms of incipient instability that are detected within vulnerable areas, namely power oscillations, voltage variations, frequency deviations and overloads. The extreme limits of these symptoms are known to lead to the following phenomena, respectively: transient angular instability, voltage instability, frequency instability and thermal equipment overload. All of these stresses could be rationalized into the power swing, transient voltage, transient frequency and line loading as measured in the substation where the ASI is located.

Figure 1:
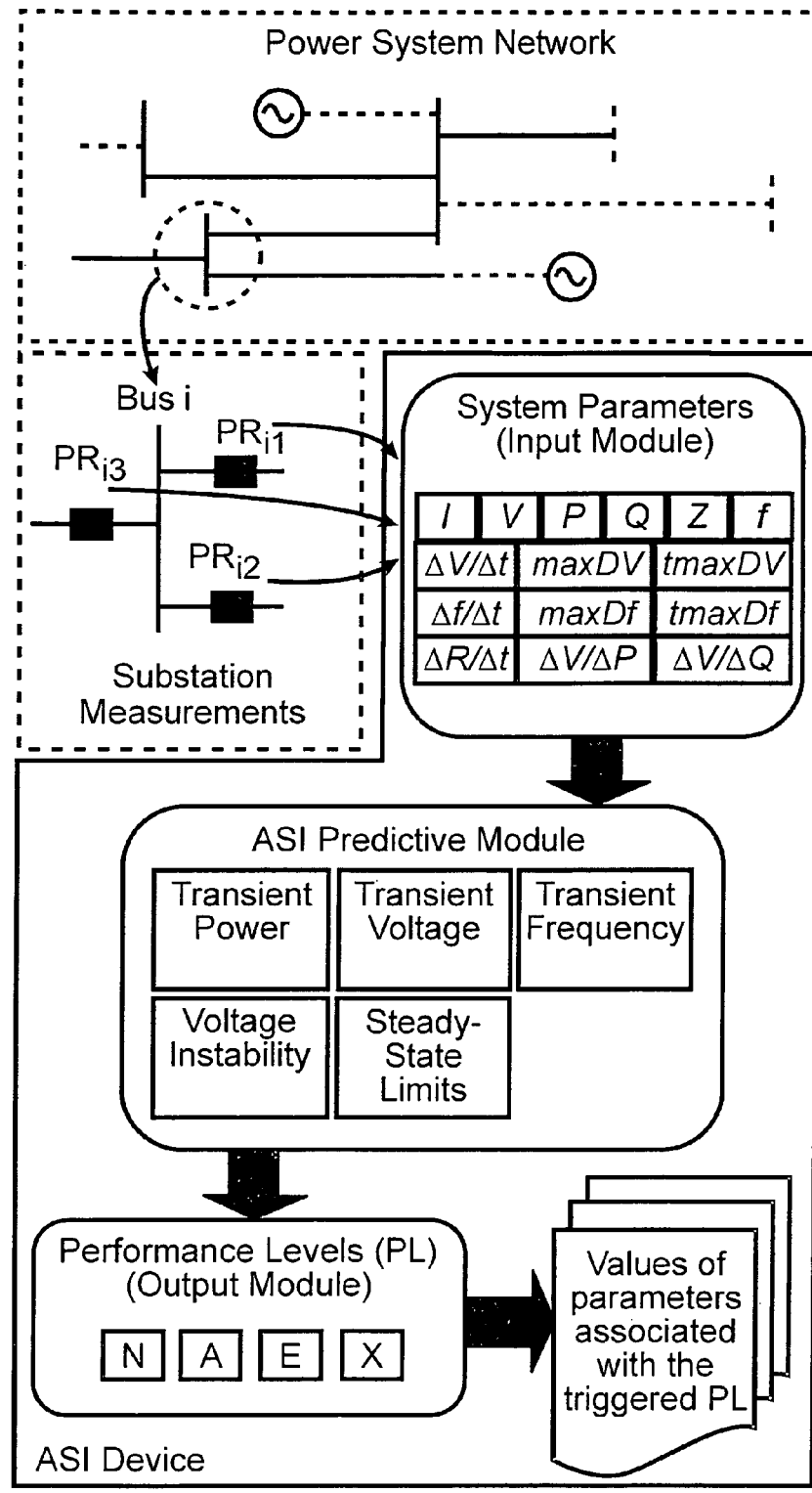
FIG. 1 shows components of a proposed ASI device in an area of vulnerability such as substation bus I with symbols N (Normal), A (Alert), E (Emergency), and X (eXtreme)

FIG. 1 shows a simplified block diagram of the ASI. The ASI is installed for one of the areas of vulnerability. There could be many areas of vulnerability in a power system; however, identification of these areas is done according to known methodologies. Optionally, an ASI is designed and installed to handle numerous areas of vulnerability within a same location. As illustrated in FIG. 1, each ASI comprises three modules, namely: A) Input module, B) predictive module, and C) output module. The ASI acquires system parameters from existing local protective relays that process measured currents and voltages in a substation and provides measurements or parameters to the ASI.

The input module acquires the system parameter. Local protective relays are used for this purpose since they normally incorporate three fundamental functions, namely: continual monitoring of system parameters, detection of a disturbance and actuation of timely measures. Exemplary parameters are defined as follows:

$I_i = \lfloor I_{i1} \, I_{ij} \, K \, I_{iq_-} \rfloor$; is the current vector of bus i.
$V_i = \lfloor V_{i1} \, V_{ij} \, K \, V_{iq_-} \rfloor$; is the voltage vector of bus i.
$P_i = \lfloor P_{i1} \, P_{ij} \, K \, P_{iq_-} \rfloor$; real power vector of bus i.
$Q_i = \lfloor Q_{i1} \, Q_{ij} \, K \, Q_{iq_-} \rfloor$; reactive power vector of bus i.
$f_i$; the frequency of bus i $$Z_{ij} = \frac{V_{ij}}{I_{ij}};$$

apparent impedance seen by relay $PR_{ij}$
$R_{ij} = Re\{Z_{ij}\}$; apparent resistance seen by relay $PR_{ij}$ $$\frac{\Delta R_{ij}}{\Delta t};$$

rate-of-change of the apparent resistance $$\frac{\Delta V_i}{\Delta t};$$

rate-of-change of voltage on bus i $$\frac{\Delta f_i}{\Delta t};$$

rate-of-change of frequency on bus i
max $DV_i$; maximum voltage dip on bus i
t max $DV_i$; duration of the maximum voltage dip
min $Tf_i$; minimum transient frequency on bus i
t min $Tf_i$; duration of the minimum transient frequency $$\frac{\Delta V_i}{\Delta P_i};$$

rate-of-change of voltage with real power $$\frac{\Delta V_i}{\Delta Q_i};$$

rate-of-change of voltage with relative power
i=1, 2 . . . . . . . . . , p (the $i^{th}$ bus)
j=1, 2 . . . . . . . . . , q (the $j^{th}$ branch)

The predictive module is a processing model for predicting a system performance level at a specific location by processing and correlating historical and real-time system parameters. An exemplary model was constructed from aggregation of five basic performance characteristics that are sensitive to system stress. As illustrated in FIG. 1, these characteristics comprise: 1) transient power swing, 2) transient voltage, 3) transient frequency, 4) voltage instability, and 5) steady-state limits. In this way, the prediction model integrates three security assessments, namely: dynamic, voltage and static. Different candidate predictors have been extracted from these characteristics and analyzed.

ASI predictors are extracted from the five performance characteristics of the power system at the location, namely: transient power swing, transient voltage, transient frequency, voltage instability, and steady-state limits.

Figure 2:
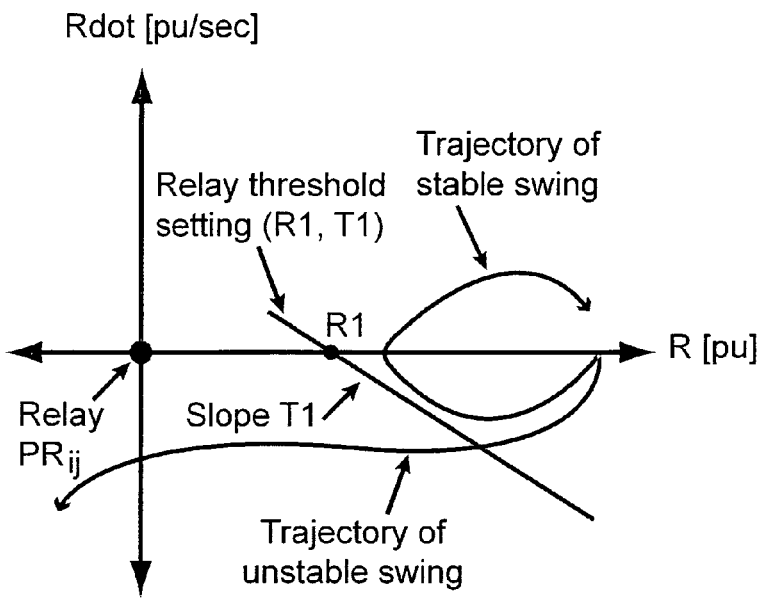
FIG. 2 shows a trajectory of the R-Rdot seen by the relay $PR_{ij}$ of the ASI on bus I with symbols R1 (resistance setting) and T1 (dR/dt setting).
Figure 3:
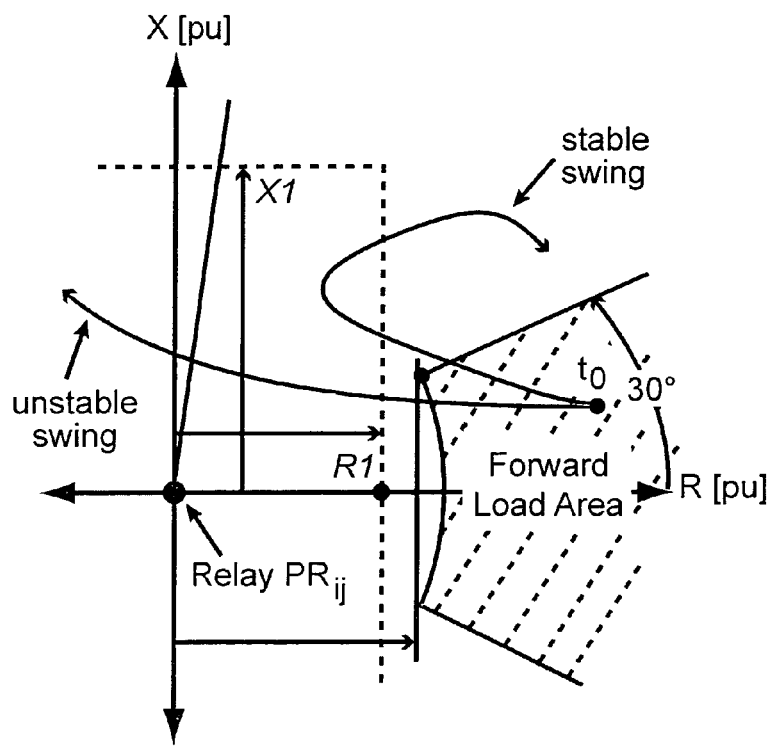
FIG. 3 shows a trajectory of the apparent impedance seen by the relay $PR_{ij}$ of the ASI on bus I with symbols R1 (resistance of zone-1 setting), X1 (reactance of zone-1 setting), and $t_0$ (pre-disturbance state).

The transient power characteristic is investigated in terms of two trajectories, namely: R-Rdot trajectory and R-X impedance trajectory as seen from the ASI location as shown in FIGS. 2 and 3. From these characteristics, there are four selectable candidate predictors as follows:
$x_1 = R$; apparent resistance [pu]

$$x_2 = \frac{\Delta R}{\Delta t};$$

rate-of-change of the apparent resistance [pu/sec]
$x_3 = U.\cos(\phi)$; absolute value of the phase-voltage times power factor [pu]

$$x_4 = \frac{\Delta(U \cdot \cos(\varphi))}{\Delta t};$$

rate-of-change of the voltage times power factor [pu/sec]

The predictors $x_1$ and $x_2$ are, for example, based on the R-Rdot relay, which has been developed by Bonneville Power Administration (BPA). The concept of this relay is that apparent resistance becomes small when the phase angle across an AC inertia becomes large. Apparent resistance also becomes small during short-circuit faults, and the rate-of-change is used to help distinguish between fault and loss of synchronism conditions.

The predictor $x_3$ is known for detecting power swings and with its derived predictor $x_4$ used in some of Brown Boveri distance relay schemes. The concept of this detection technique is that when two-source system loses stability and goes into an out-of-step situation, the angle difference of the two sources increases as a function of time. This affects the measured local quantities $x_3$ and $x_4$.

Figure 4:
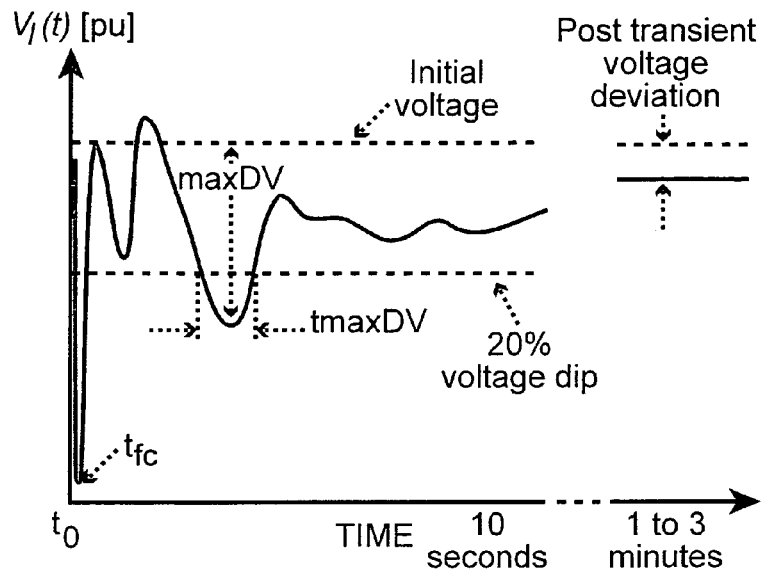
FIG. 4 shows WSCC transient voltage performance parameters at bus i.

In the present embodiment, the transient voltage characteristic is based on the transient voltage criteria measured in terms of the performance of a system under conditions of stress. The minimum level of performance that is acceptable under simulation tests is given in FIG. 4. From this characteristic, two candidate predictors are selected as follows:

$x_5$=max DV; maximum voltage dip [pu]
$x_6$=t max DV; duration of the maximum voltage dip [sec]

3) The Transient Frequency Characteristic, similar to the aforementioned voltage criteria, is based on the transient frequency criteria defined by the WSCC. From this characteristic, two candidate predictors are selected as follows:

$x_7$=min Df; minimum frequency deviation [Hz]
$x_8$=t min Df; duration of the minimum frequency [sec]

Figure 5:
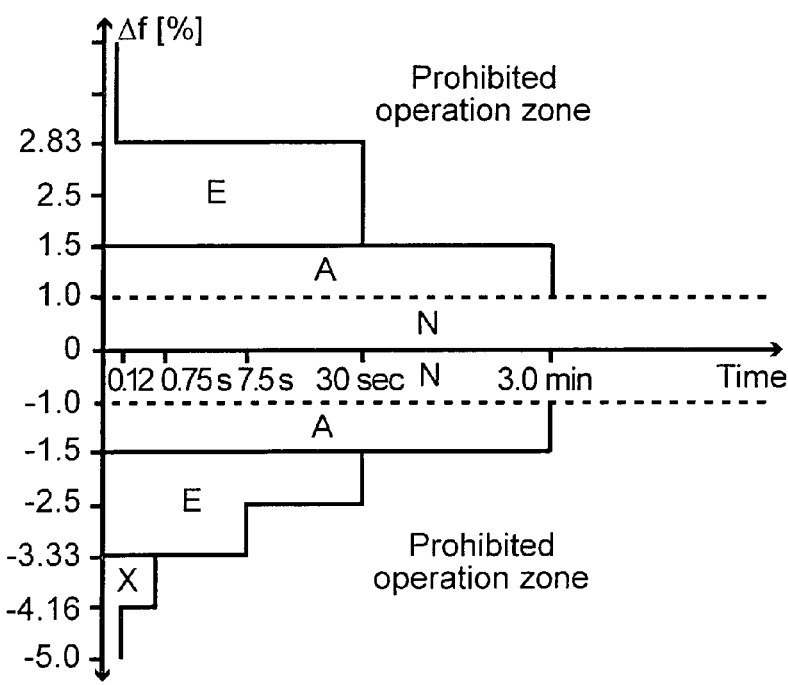
FIG. 5 shows transient frequency performance parameters at bus i

In addition, depending on the installations at bus i, it is also beneficial to alert the system operator for: a) a situation of less than normal system frequency band on the network at bus i, and b) an underfrequency level detection output signal indicating a possible trip of a unit. These are shown in FIG. 5 and described in ANSI/IEEE standard C37.106.2003 guide for abnormal frequency protection for power generating plants.

Figure 6:
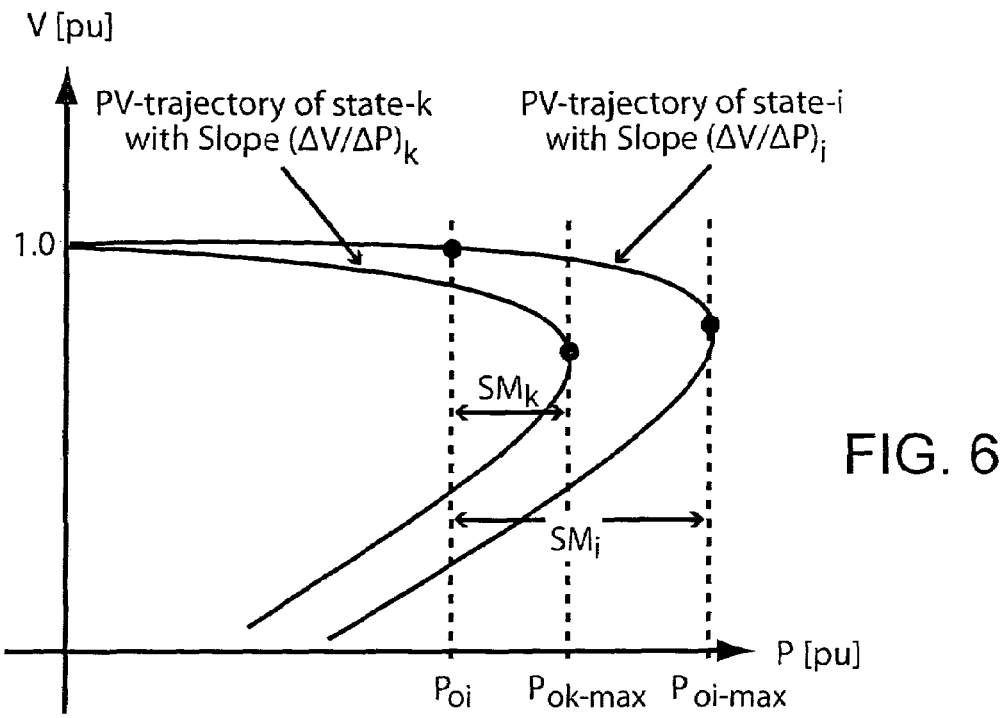
FIG. 6 shows power-voltage characteristics at an ASI location with symbols SM (security margin), Poi (pre-disturbance operating power at state-i), and Pok (post-disturbance operating power at state-k).

The voltage instability characteristic is investigated in terms of two trajectories, namely: P-V and Q-V. FIG. 6 shows a typical P-V characteristic as seen from the ASI location. From these characteristics, there are three candidate predictors that are selectable as follows:

$$x_9 = \frac{\Delta V}{\Delta P};$$

rate-of-change of bus voltage with bus real power injection [pu]

$$x_{10} = \frac{\Delta V}{\Delta Q};$$

rate-of-change of bus voltage with bus reactive power injection [pu]
$x_{11}$=SM; security margin [pu]
Optionally, other techniques are used to estimate voltage-stability margin based on local measurements.

Figure 7:
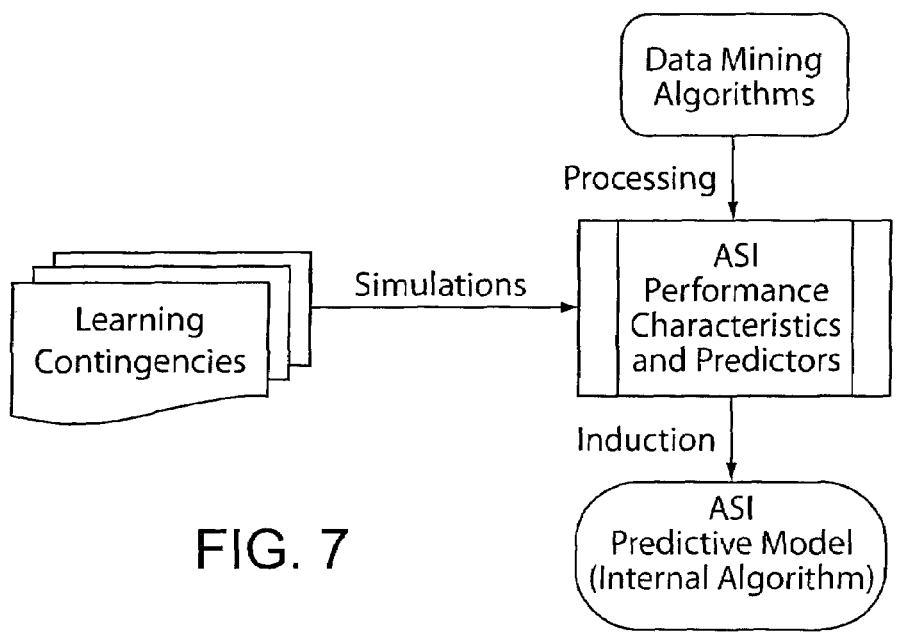
FIG. 7 shows construction of the ASI Predictive Model

The Steady-State Characteristic is investigated in terms of thermal current limits and post-transient voltage deviation as given by the following predictors:

$$x_{12} = \sum_{j=1}^{nl} \left(\frac{P_j}{P\max_j}\right)^2;$$

overloading index [pu]

$$x_{13} = \sum_{j=1}^{nl} XL_j P_j^2;$$

voltage deviation index [pu]
$P_j$ is the active power flow on branch j
$P\max_j$ is the rating of branch j
nl is the set of branches at the ASI location
$XL_j$ is the reactance of branch j The construction methodology of the ASI predictive model is shown in FIG. 7. It comprises four main components, namely: a) data mining processes, b) ASI performance characteristics and predictors, c) training contingencies, and d) ASI predictive model. The ASI performance characteristics and predictors have already been described hereinabove. The other components are discussed in the following sections.

A mathematical representation of the ASI predictive model within a data mining framework is as follows.

$$\underline{X} = \{X_1, X_2, K K K X_m\}^{tr} \quad (1)$$

$$X_i = \{x_{i1}, x_{i2}, K x_{ij} K x_{in}\} \quad (2)$$

$$\underline{S} = \{S_1, S_2, K S_i K S_m\}^{tr} \quad (3)$$

$$\underline{E} = \{(X_k S_k), k=1, 2, L, m\} \quad (4)$$

Where:
$\underline{X}$ is m-dimensional pattern vector.
$\overline{m}$ is the dimension of the pattern vector.
tr is vector transpose.
$X_i$ is the $i^{th}$ pattern vector of the X.
$x_{i1}, x_{i2}, \ldots x_{ij} \ldots x_{in}$ are independent variables (or predictors) of the pattern vector $X_i$.
n is the number of independent variables.
S is a vector of class variables associated with X.
$S_1, S_2, \ldots, S_m$ are class (or dependent) variables of the class vector S. Where the categorical membership variables of $S_i$ are defined as follows: S1 is no severity (N for normal), S2 is low severity (A for alert), S3 is Moderate severity (E for emergency) and S4 is High severity (X for extreme).
(X, S) is defined as jointly distributed random variables with m-dimensional vector X denoting pattern vector and S denoting the associated class vector of X
E is a vector of labeled learning contingencies with a total number of m events.

For this system, let X take values from the set $\{R^m\}$ then a decision rule $\square(X)$ is a function that maps $R^m$ into the values of the class vector S. Hence, the goal of this prediction model is to predict S based on observing X.

In order to construct an approximately optimal predictive model that defines boundary limits of ASI characteristics, the approximately optimal data model is constructed from the data set X. In the field of data mining, many data models can be constructed from a given set of data X. Though some of these models are more accurate than others, finding an optimal model is practically difficult because of large size of search space and this optimal model is often unnecessary. An approximately optimal predictive model Tk0 is constructable according to the following optimization problem.

$$\hat{R}(T_{k0}) = \min_k \{\hat{R}(T_k)\} \quad (5)$$

$$\hat{R}(T) = \sum_{t \in \hat{T}} \{r(t)p(t)\} \quad (6)$$

Where:
$\hat{R}(T_k)$ is the misclassification error rate of the model $T_k$.
$T_{k0}$ is the optimal data model that minimizes the misclassification error $\hat{R}(T_k)$.
T is a data model $\square\{T_1, T_2, \ldots, t_1\}$
k is model index number
t is a subset in a data model $t_1$ is the root subset in the data model
$\tilde{T}$ is a set of terminal subsets of the data model T
r(t) is resubstitution estimate of the misclassification error of a case in subset t.
p(t) is probability that any event falls into subset t.

Any predictive model T is a collection of nested binary partitions, and can be represented in the following recursive form:

$$T=\{(n, q, m, n^L n^R)T^L, T^R\} \quad (7)$$

Equation 7 defines the predictive model T in terms of pattern lattice L created by partitioning of the features planes.

The equation states that Lattice L can be binary partitioned on the predictor axis q into mutually exclusive left and right data sets. The left data set includes lattice elements with feature q values smaller than the threshold value. While, the right data set includes lattice elements with predictor q values larger than the threshold value. A binary partition can also be denoted by a five-tuple (n, q, m, nL, nR), where: n denotes a decision node label for the partition, q is the predictor axis, m is the threshold value used for the partition, and nL and nR are the node labels for the partition of the left and right data sets, respectively. TL and TR denote the subset data models defined on the left and right sets of a partition.

One measure of impurity of ASI prediction model T is the Entropy thereof. It provides a measure of how much one knows about severity levels S={N, A, E, X}. The impurity of the subset $T_k$ of all possible states corresponding to some subset $T_k$ of the prediction model T is given by the following equation:

$$i(T_k) = -\sum_S p(S|T_k)\log_2(p(S|T_k)) \quad (8)$$

The information carried by the prediction model T of K subset data models is then the weighted average of the Entropies given by equation 8. Thus the impurity of the prediction model T is given by the following equation:

$$I(T) = \sum_{k=1}^{K} i(T_k)p(T_k) \quad (9)$$

Learning contingencies are used to construct an ASI predictive model. In this approach, extensive contingencies are simulated off-line in order to capture characteristics of system behavior that produce this predictive model. The definitions of these contingencies used for the present embodiment are based on five main sources, namely: a) the reliability and security standards defined by NERC and WSCC councils, b) the operational requirements defined by a given utility, c) specific utility design criteria, d) event recorder data and heuristic data, and e) possible operating network topologies. The contingencies can be categorized into faults and switching actions under different operating conditions and system topology. Of course, other standards or other learning contingencies are potentially applicable in other applications or for other providers.

Figure 8:
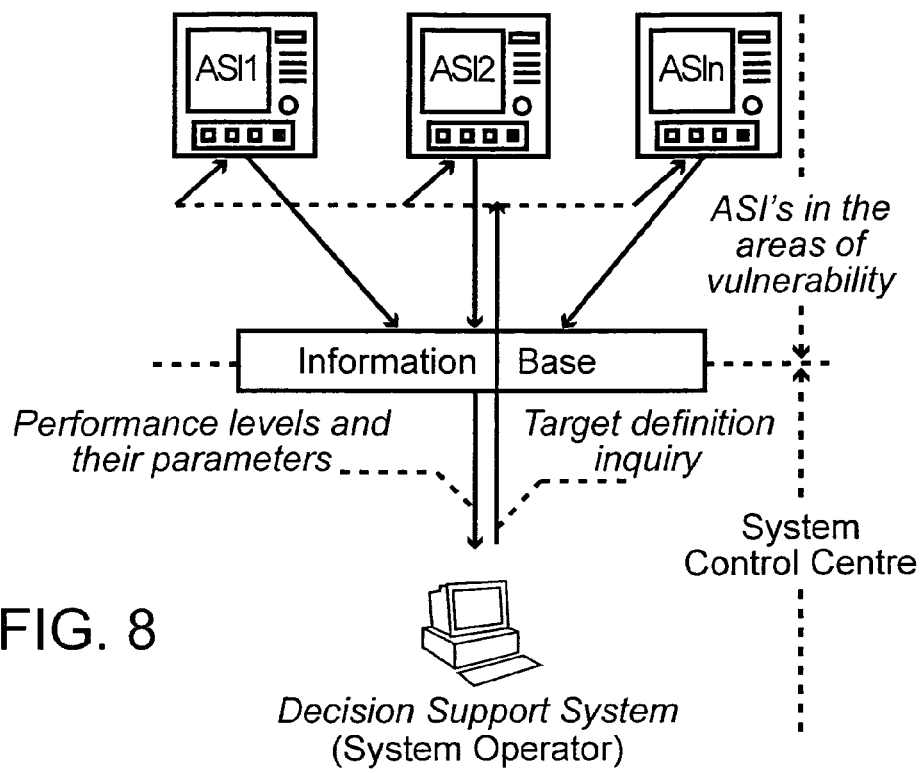
FIG. 8 shows interfacing of the ASIs in the areas of vulnerability with the system operator

The ASI predictive model is a set of processes to be installed within the ASI processing module of FIG. 1. The predictive model is determined off-line by mining a predictors' database produced from simulations of learning contingencies, for example those described above. Once the predictive models of ASIs in identified areas of vulnerability are constructed, they are then installed in their corresponding ASI location and interfaced with the system operator as shown in FIG. 8.

The output module provides a stress level indication corresponding to the severity of a disturbance at a given location. Stress level indications range between having no appreciable adverse system effects to having substantial effects. As indicated in FIG. 1, four levels of stress (N, A, E and X) are adopted in this embodiment, and they describe the states Normal, Alert, Emergency and eXtreme, respectively. The concept of these levels complies with the WSCC and NERC performance levels.

Figure 9:
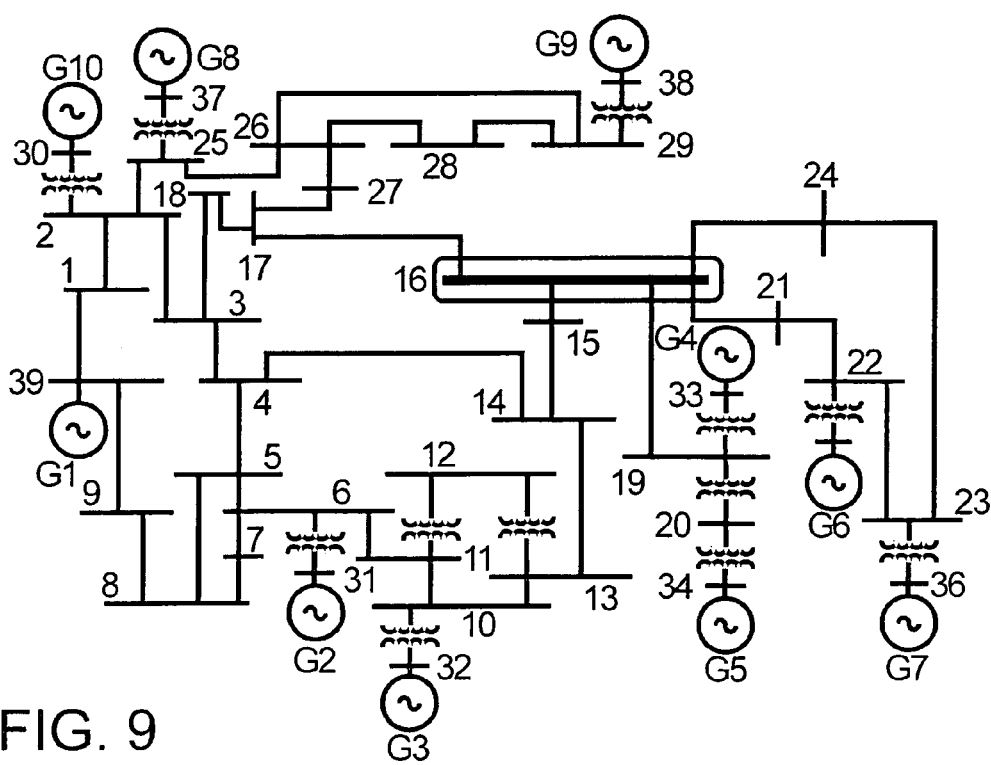
FIG. 9 shows a case-study with the ASI device installed at substation bus 16.
Figure 10:
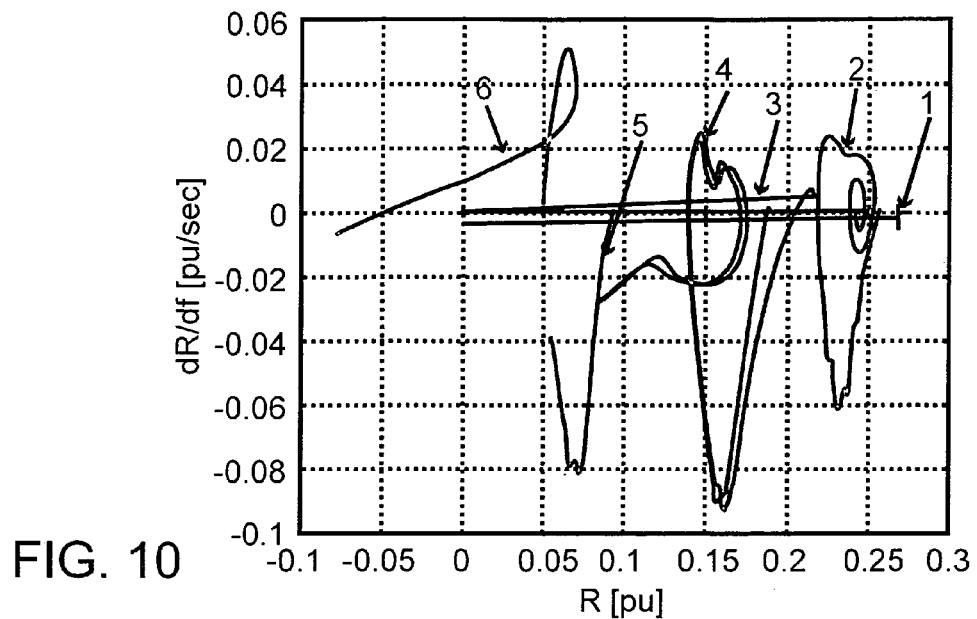
FIG. 10 shows a trajectory of the R-Rdot seen by the ASI on bus 16 with 1) no fault condition (Normal state), 2) single-phase fault on bus 17 with normal clearing (Alert state), 3) three-phase fault on bus 17 with normal clearing (Emergency state), 4) single-phase fault on bus 17 with delayed clearing (Emergency state), 5) three-phase fault on bus 17 with delayed clearing (eXtreme state), 6) loss of two lines 16-19 and 16-24 (eXtreme state).
Figure 11:
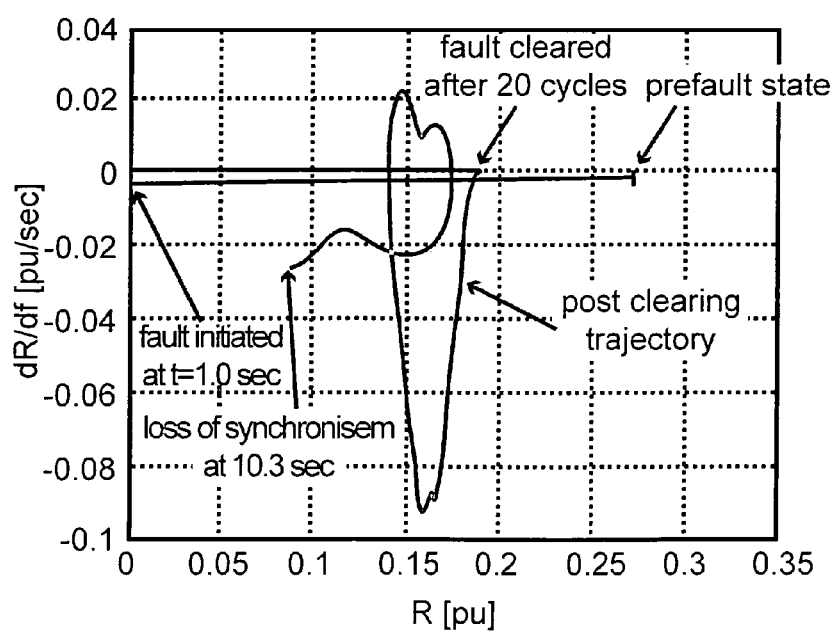
FIG. 11 shows details of the trajectory of the R-Rdot seen by the ASI on bus 16 for single-phase fault on bus 17 with delayed clearing (Emergency state).
Figure 12:
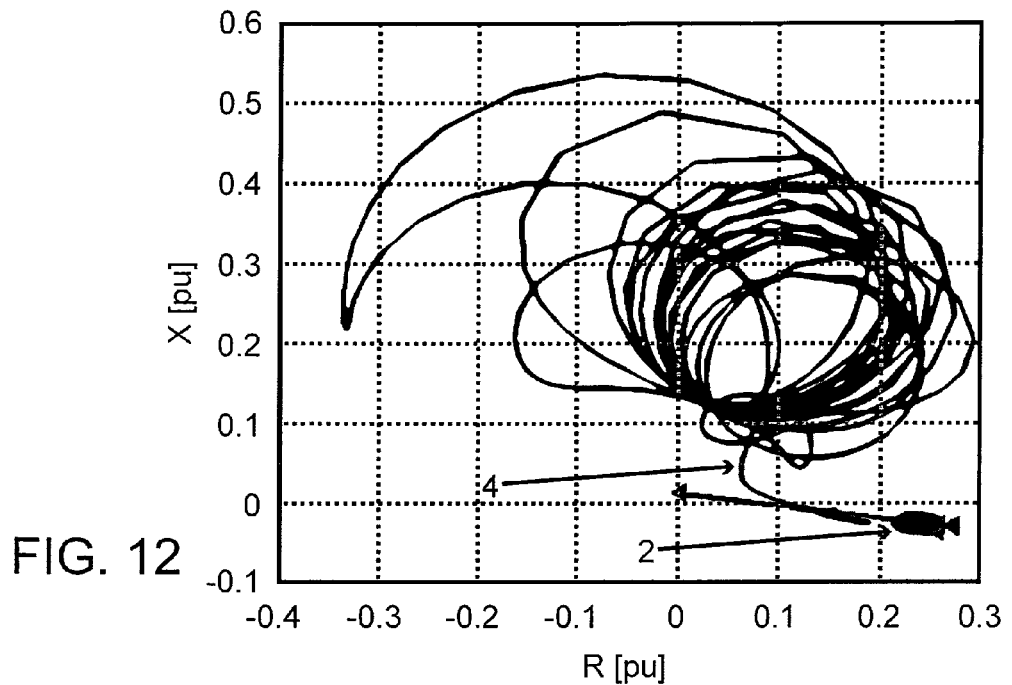
FIG. 12 shows a trajectory of the apparent impedance seen by the ASI on bus 16 with 2) single-phase fault on bus 17 with normal clearing (Alert state), 4) single-phase fault on bus 17 with delayed clearing (Emergency state).
Figure 13:
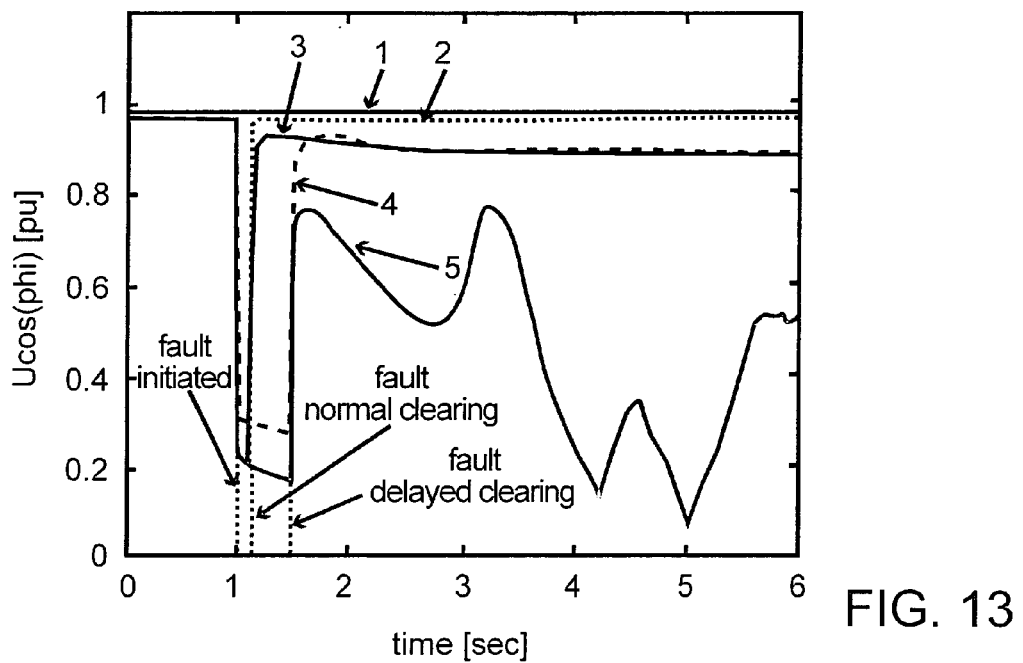
FIG. 13 shows $U.\cos(\phi)$ characteristics at the ASI location on bus 16 with 1) no fault condition (Normal state), 2) single-phase fault on bus 17 with normal clearing (Alert state), 3) three-phase fault on bus 17 with normal clearing (Emergency state), 4) single-phase fault on bus 17 with delayed clearing (Emergency state), 5) three-phase fault on bus 17 with delayed clearing (eXtreme state).

An ASI was studied for Bus 16 of the IEEE 39-bus system that had 10 machines, 19 loads, 36 transmission lines and 12 transformers. A single-line diagram of this system is shown in FIG. 9. The functions of the ASI is to interpret the on-line data of system performance and to relate this to the record of system response under adverse conditions which has already been determined off-line and installed. From its embedded process the ASI device predicts the response of the system under similar stresses. A system of Severity Level signals Normal, Alert, Emergency and eXtreme, as shown in FIG. 1, advises a System Operator of a possible system collapse.

The database of the training contingencies generated on the basis of plausible scenarios, corresponded to various topologies, load levels, and generation dispatches with a total number of the generated contingencies of 1757 covering the following:

No contingencies with all facilities in service under 4 operating conditions including 50%, 75%, 100% and 125%. The interconnected transmission systems are planned, designed, and constructed to comply with NERC standards. In these cases, the severity level is Normal (Category A according to NERC). System performance assessments should confirm that: a) line and equipment loadings shall be within applicable thermal rating limits, b) voltage levels shall be maintained within applicable limits, c) all customer demands shall be supplied, and d) stability of the network shall be maintained. The system performance level under these conditions is Normal.

Single-element outage contingencies with 36 transmission lines faults under: a) 3 fault locations on each line including local-end line, mid-line, and remote-end line, b) normal clearing time, c) 4 operating conditions including 50%, 75%, 100% and 125% and d) 2 types of faults including single and three-phase faults. System performance assessments based on these system simulations should show that for system conditions where the initiating event results in the loss of a single generator, transmission circuit, or power transformer, and with all line and equipment loadings are within applicable thermal ratings, voltages are within applicable limits, and the systems are stable for selected demand levels. The system performance level under these contingencies is Alert.

Single-element outage contingencies without faults under 4 operating conditions including 50%, 75%, 100% and 125%. These elements include 36 lines, 19 loads and 10 generation units. All line and equipment loadings are within applicable thermal ratings, voltages are within applicable limits, and the systems are stable for selected demand levels. The system performance level under these contingencies is Alert.

Double contingencies with two separate events occur resulting in two or more elements out of service with time for manual system adjustments between events. These events are single-phase or three-phase faults, with normal clearing, system adjustments, followed by another single-phase or three-phase fault, with normal clearing. All line and equipment loadings are within applicable thermal ratings, voltages are within applicable limits, and the systems are stable for selected demand levels. The system performance level under these contingencies is Emergency.

Two elements outage contingencies with the initiating event results in the loss of two or more elements. There are 36 transmission lines faults with: a) single-phase fault, b) mid-line fault location, and c) delayed clearing time. All line and equipment loadings are within applicable thermal ratings, voltages are within applicable limits, and the systems are stable for selected demand levels. The system performance level under these contingencies is Emergency.

Extreme contingencies with the initiating fault event results in the loss of two or more elements. There are 36 transmission lines faults with: a) three-phase fault, b) mid-line fault location, and c) delayed clearing time. The system performance level under these contingencies is eXtreme.

Extreme contingencies with the initiating switching event results in the loss of two or more elements. Such contingencies include: a) Loss of all transmission lines on a common right-of-way, and b) loss of a substation (one voltage level plus transformers). The system performance level under these contingencies is eXtreme.

Using these contingencies, a model was constructed for use in an ASI for providing predictive signaling to an operator for indicating a network status from a location. Such an ASI is advantageous as it operates from local conditions and locally providing a local operator with information derived locally and based on locally sensed data. Thus, it is an excellent verification of a central determination or, alternatively, is usable instead of a central determination.

According to another embodiment of the invention an intelligent-based approach for islanding detection relaying is presented. It uses multiple system parameters to identify and classify any possible islanding operation at a specific target location (the location at which the islanding detection is to be installed). The identification and classification process are performed for example by decision tree pattern recognition classifier trained by analyses of massive credible events for this target location. Such analyses of massive credible events for example being determined from the data mining of events and characteristics of events, said data mining also providing a means for determining thresholding conditions.

Amongst the benefits of using different system parameters in the proposed technique is to allow detection of islanding operations under:

minimum detectable zones due to reduced mismatching power at the target location, distributed generations with multiple distributed resources and a system under different operating conditions.

By recognizing the patterns of the sensitivities of some indices at the target location to prescribed credible events, since every event could have a signature on the patterns of these indices, it is possible to predict or determine a future or past event. This concept is illustrated mathematically with reference to a typical distributed generation shown in FIG. 14. In this distributed system, a mathematical representation of the target location at $DR_x$. The following independent variables are defined with respect to this target location. The current and voltage signals are acquired at this location.

The behavioral model of the proposed islanding detection technique can be represented with in the decision tree.

$$\underline{X} = \{X_1, X_2, K\ K\ K\ X_n\}^T \quad (10)$$

$$X_i = \{x_{i1}, x_{i2}, K\ x_{ij}\ K\ x_{im}\} \quad (11)$$

$$Y = \{y_1, y_2, K\ K\ K\ y_n\}^T \quad (12)$$

$$E = \{(X_k, y_k), k=1, 2, L, N\} \quad (13)$$

where:

$\underline{X}$ n-dimensional vector denoting pattern (or classification) vector. X is called an ordered or numerical pattern if its independent variables take values from an ordered set, and categorical if its independent vectors take values from a set not having a natural ordering;

$X_i$ $i^{th}$ pattern vector of the $\underline{X}$;

$x_{i1}, x_{i2}, \ldots x_{ij} \ldots x_{im}$ independent variables (or features) of the pattern vector $X_i$;

m number of independent variables;

Y vector of class (or dependent) variables associated with $\underline{X}$;

$y_1, y_2, \ldots y_i \ldots y_n$ class (or dependent) variables of the class vector Y;

$(\underline{X}, Y)$ jointly distributed random variables with n-dimensional vector denoting pattern X vector and Y denoting the associated class vector of $\overline{\underline{X}}$;

E vector of labeled credible events with a total number of events.

For this system, let $\underline{X}$ take values from the set $\{R^n\}$, then a decision rule $\Box(X)$ is a function that maps $R^n$ into the values of the class vector Y. Hence, the goal of this decision tree is to estimate Y based on observing $\underline{X}$.

Normally, the indices are chosen to include all possible sensitive system parameters that could be affected by islanding and that can be measured locally. In the proposed technique, the following 11 indices are chosen and defined for any target distributed resource $DR_x$:

$x_{i1} = \Delta f_i$ frequency deviation (Hz) under the $i^{th}$ event;

$x_{i2} = \Delta V_i$ voltage deviation (pu) under the $i^{th}$ event;

$x_{i3} = (\Delta f/\Delta t)_i$ rate-of-change of frequency (Hz/s) under the $i^{th}$ event;

$x_{i4} = (\Delta V/\Delta t)_i$ rate-of-change of voltage (pu/s) under the $i^{th}$ event;

$x_{i5} = (\Delta P/\Delta t)_i$ rate-of-change of the $DR_x$ power (MW/s) under the $i^{th}$ event;

$x_{i6} = (\Delta f/\Delta P)_i$ rate-of-change of frequency over power (Hz/MW) under the $i^{th}$ event;

$x_{i7} = CTHD_i$ total harmonic distortion of the current (pu) under the $i^{th}$ event;

$x_{i8} = VTHD_i$ total harmonic distortion of the voltage (pu) under the $i^{th}$ event;

$x_{i9} = \Delta pf_i$ power factor deviation under the $i^{th}$ event;

$x_{i10} = (U.\cos(phi))_i$ absolute value of the phase-voltage times power factor [pu] under the $i^{th}$ event;

$$x_{i11} = \left(\frac{\Delta(U \cdot \cos(phi))}{\Delta t}\right)_i$$

gradient of the of the voltage times power factor (pu/s) under the $i^{th}$ event.

The possible values of any class variables ($y_i$) can be given by the binary set $\{0, 1\}$ such that: $y_i = 0$, for non-islanding condition, and $y_i = 1$ for islanding condition.

The proposed methodology involves: 1) working methods which engage various tasks associated with any selected distributed resource and 2) definition of prescribed events for training the pattern classification model.

Figure 14:
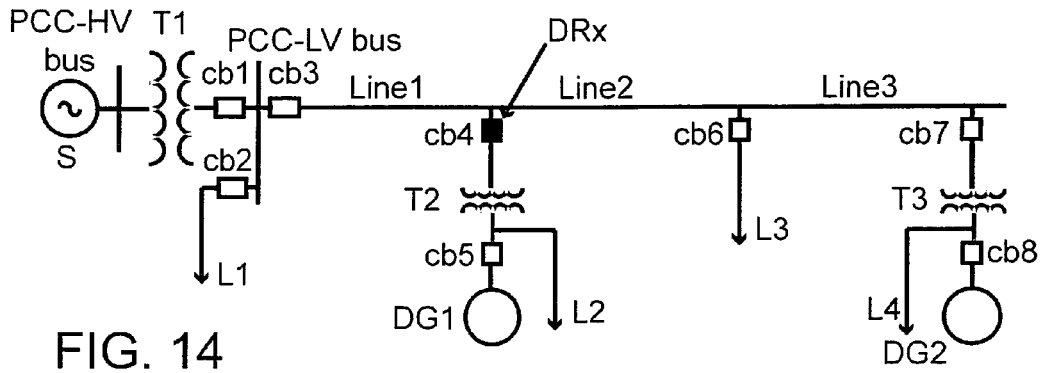
FIG. 14 shows a typical distributed generation with the target islanding location at DRx with S (equivalent system), T (power transformer), L (load), G (generator), cb (circuit breaker), and PCC bus (point of common coupling).
Figure 15:
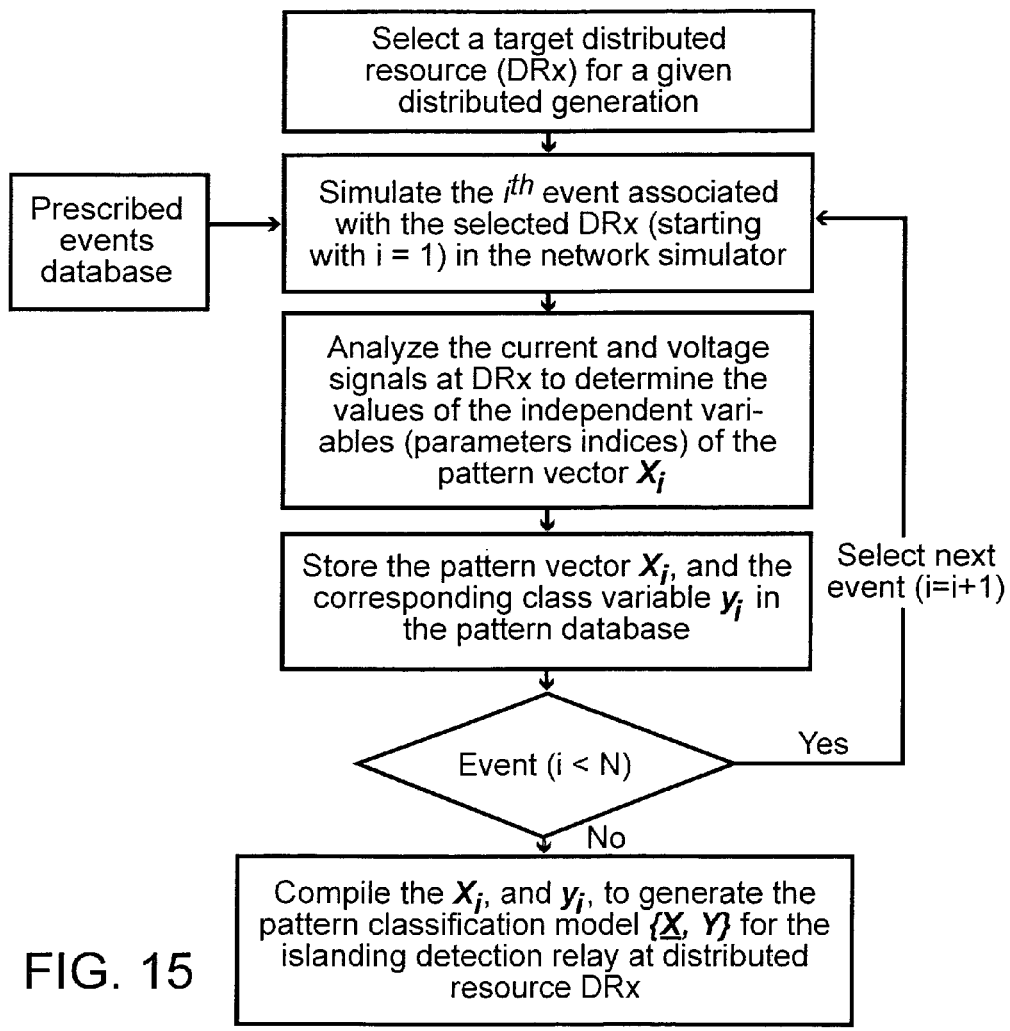
FIG. 15 shows a methodology of intelligent-based islanding detection.

The methodology starts with a target location in which an islanding detection is to be installed, such as in this particular case, islanding detection of the distributed resource shown in FIG. 14. These tasks can be identified as shown in FIG. 15 and summarized as follows.

1) Select a target distributed resource location in which an islanding is to be installed for a given distributed generation.
2) Simulate the prescribed events that are associated with the selected $DR_x$, one event at a time, in the network simulator. These events are prescribed in an event database.
3) Analyze the current and voltage signals that are generated from the simulation in order to determine the values of the independent variables (system parameter indices) of the pattern vector.
4) Store the determined pattern vector along with the corresponding class variable in a pattern database.
5) Repeat steps 2 to 4 for all prescribed events.
6) Compile the pattern vector and the corresponding class variable to generate the pattern classification model for the islanding detection relay at the distributed resource location. The output data set of this methodology is a pattern classification model for the islanding detection relay at the distributed resource location as shown in FIG. 15.

In this proposed methodology, extensive prescribed events are simulated off-line in order to capture the essential features of the system behavior that produce the pattern classification model. These prescribed events are defined in an event database from which the network simulator executes the events. The definition of these events are based on three main sources, namely: a) the operational requirements in the IEEE1547 standards, b) the testing practices that are recommended by most of the manufacturers of islanding relays and c) possible operating network topologies. The prescribed events can be categorized into faults and switching actions under different network operating states. The following is a list of some possible events:

all possible tripping of circuit breakers that are liable to assume the conditions of islanding formation;
opening of any breakers between the EPS and the DG;
loss of power on the PCC bus (point-of-common-coupling between the EPS and the DG);
islanding formed in the EPS transmission system;
events that could trip all breakers and reclosers that could island the DG under study;
removing the EPS network capacitor, if any;
loss of any parallel lines of the EPS;
faults on the PCC bus with instantaneous and delayed fault-clearing times.
abrupt change in the load of $DR_x$.

Furthermore, these events are simulated under the following possible network operating states:
different EPS operating states, including normal system loading, minimum system loading, and maximum system loading;
different DG operating states, including normal DG loading, minimum DG loading, and maximum DG loading;
different operating levels of the target $DR_x$.

Figure 16:
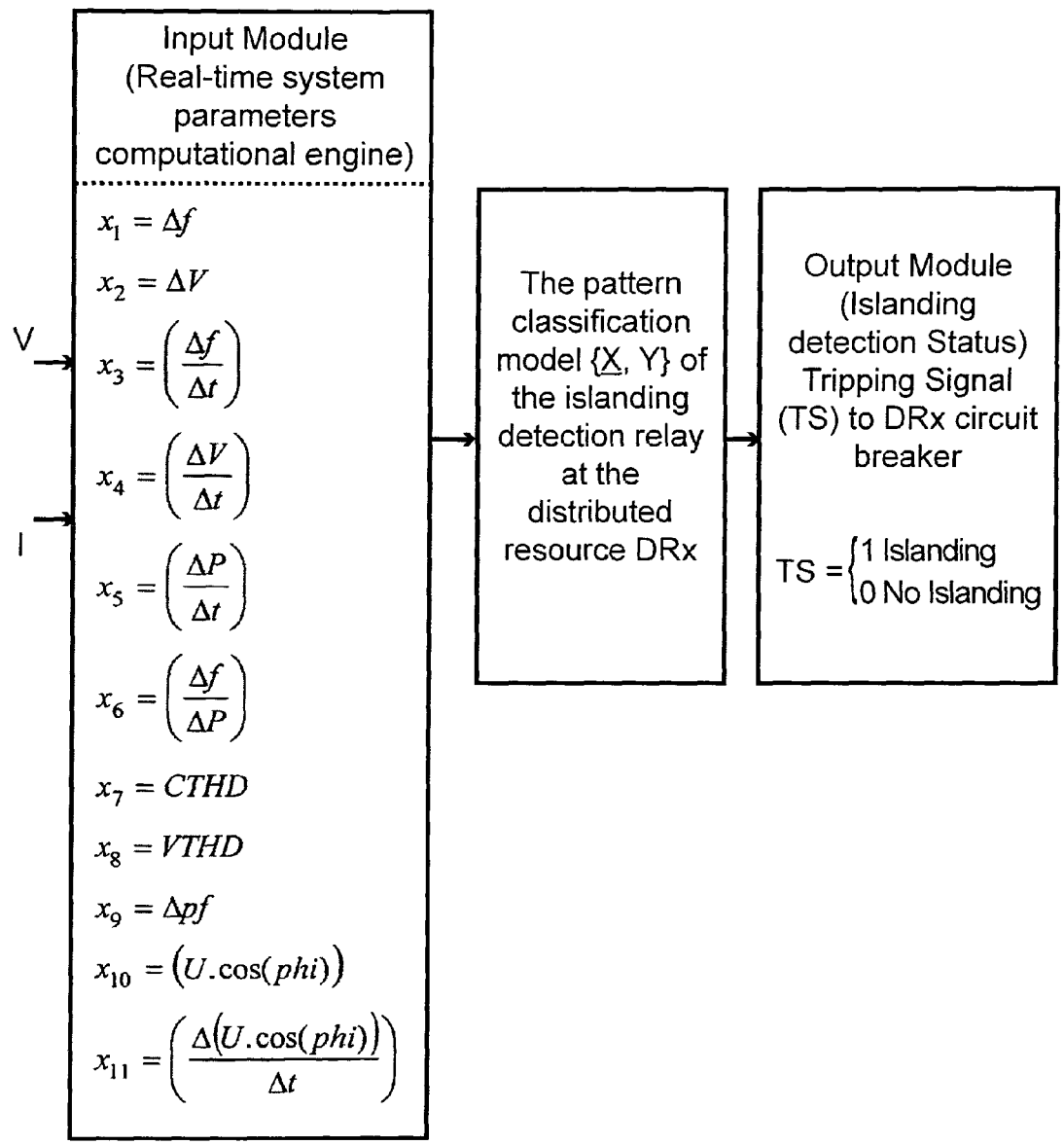
FIG. 16 shows an architecture of the proposed intelligent-based islanding detection relay.
Figure 17:
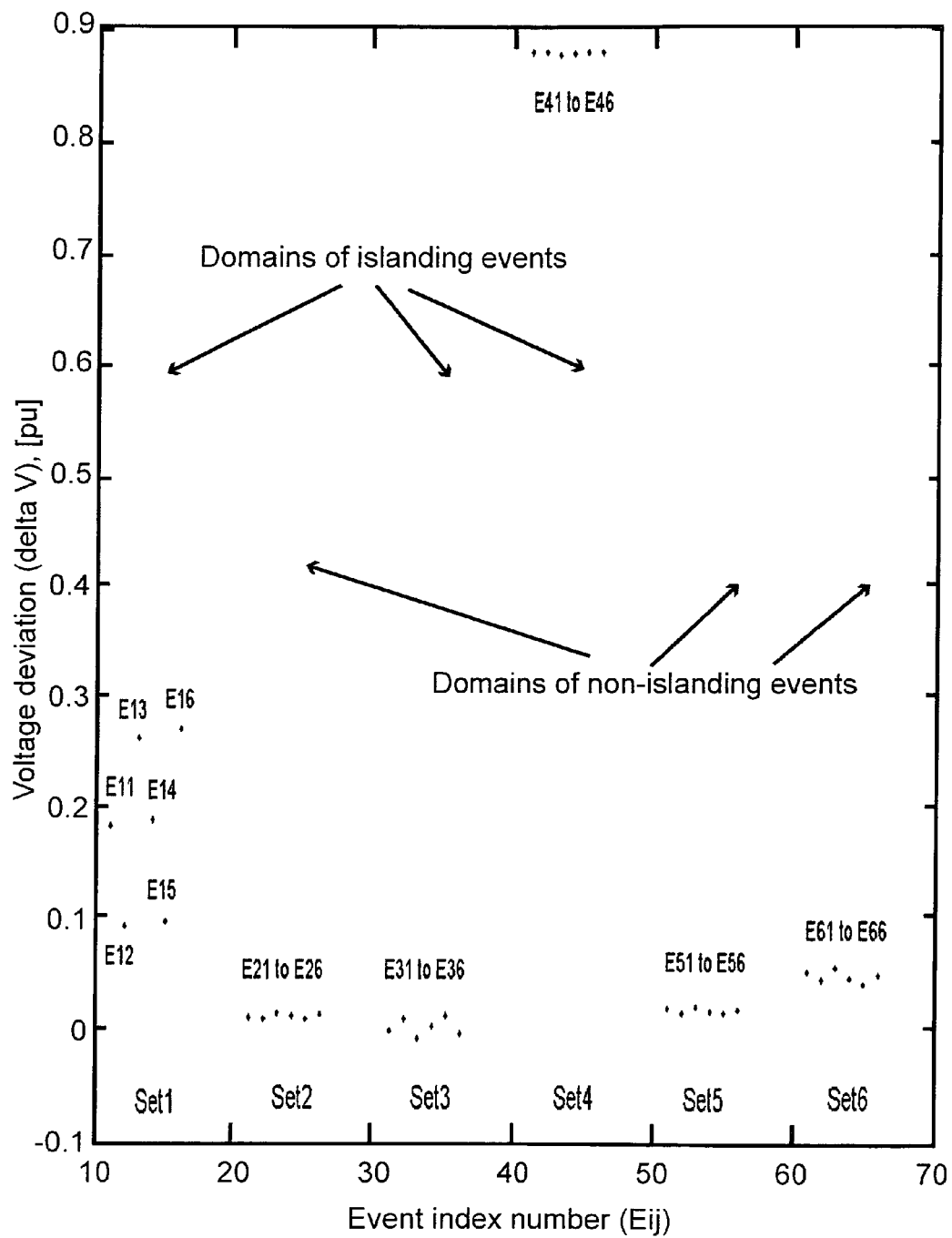
FIG. 17 shows voltage deviations at the distributed resource under all training events.
Figure 18:
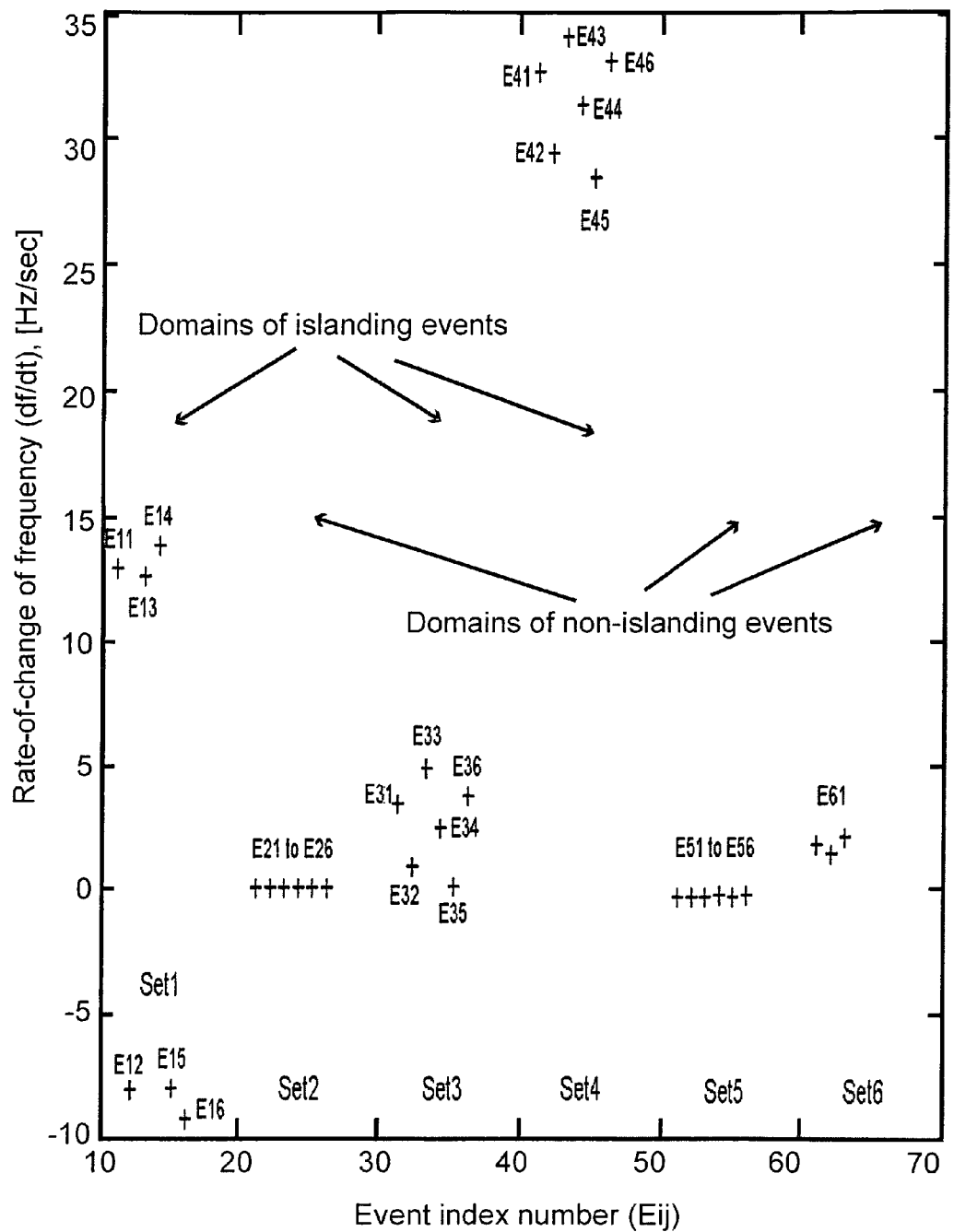
FIG. 18 shows a rate-of-change of frequency ($x_3$) at the distributed resource ($DR_x$) under all training events.
Figure 19:
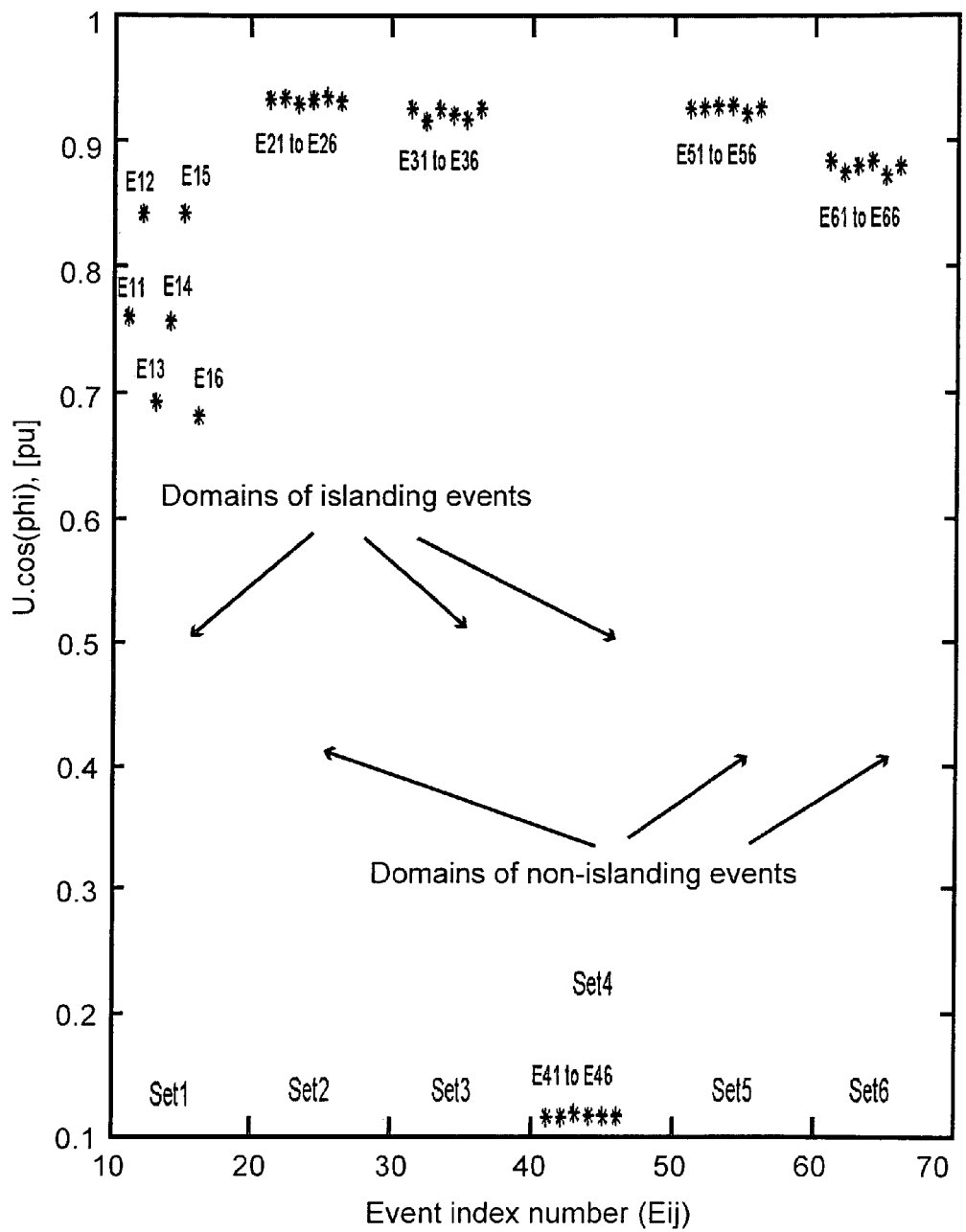
FIG. 19 shows $U.\cos(\phi)$ variations ($x_{10}$) at the distributed resource ($DR_x$) under all training events.
Figure 20:
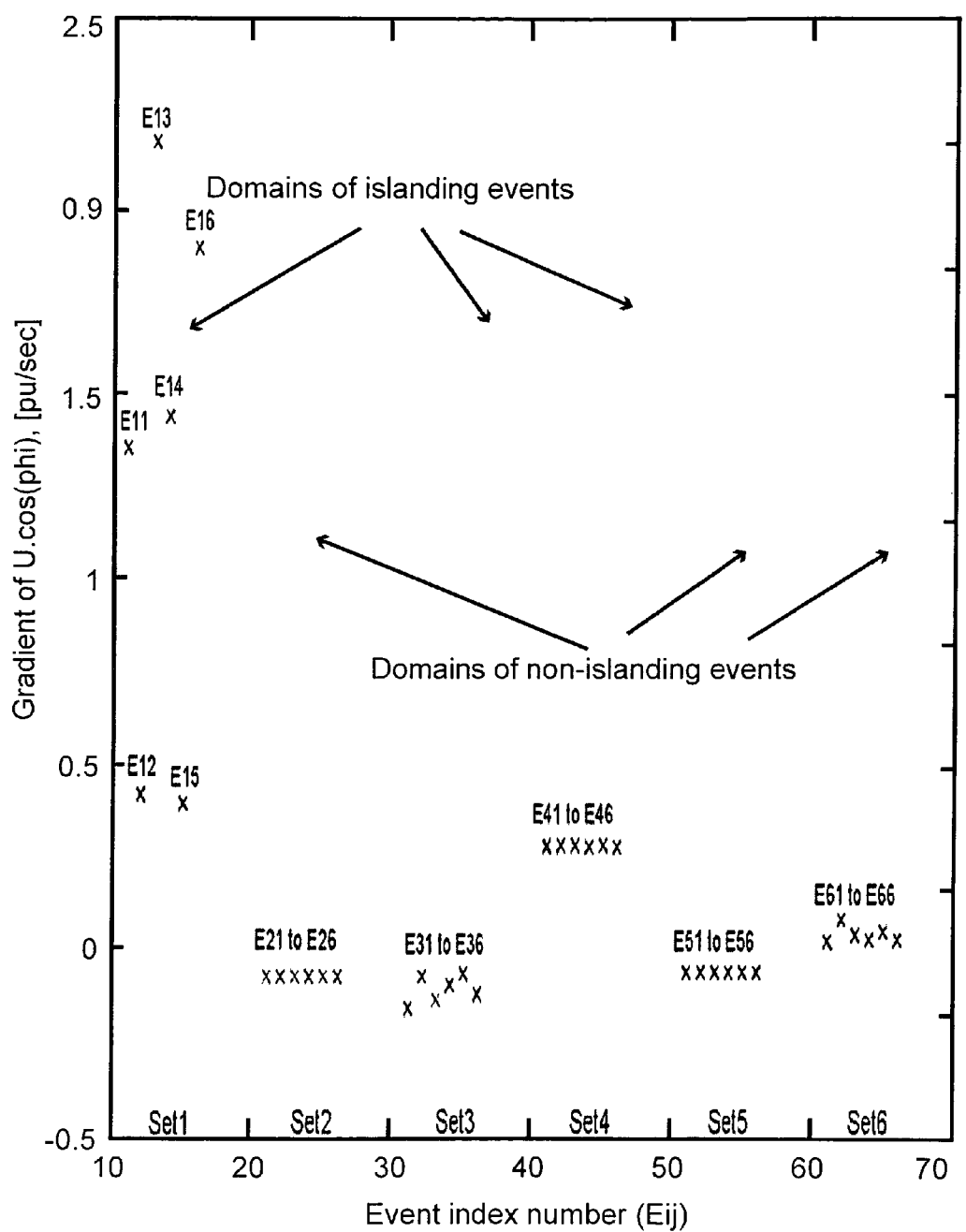
FIG. 20 shows a gradient of the $U.\cos(\phi)$ index ($x_{11}$) at the distributed resource ($DR_x$) under all training events.

The architecture of the proposed Intelligent-based islanding relay is shown in FIG. 16. It is comprises three main modules, namely the input module, pattern classification module, and the output module. The input module is a multifunction process that executes signal-processing to calculate different system parameters. These parameters are the independent variables of the proposed system and are given in the form of input vectors. The input data to this module are the three-phase currents and the three-phase voltages that are sampled at, for example, 16 samples per cycle. The vectors of the input module are as follows:

$$X=\{x_1\ x_2\ x_3\ x_4\ x_5\ x_6\ x_7\ x_8\ x_9\ x_{10}\ x_{11}\} \quad (14)$$

$$V=\{Va\ Vb\ Vc\} \quad (15)$$

$$I=\{Ia\ Ib\ Ic\} \quad (16)$$

The Pattern Classification Module is the pattern classification process and model of the islanding detection relay. This module has already been discussed above.

The output module comprises output logic unit that is connected to the tripping unit of the circuit breaker of the DR. If the islanding is detected, the output signal of this unit is logic 1. Conversely, if the islanding is not detected, the output signal of this unit is logic 0. Logic 0 and logic 1 are arbitrary labels for logic output and denote two different output signals that are useful in determining which of two functions to perform.

An example is presented here. Six sets of prescribed events are used for constructing the classification model of the target islanding relay, and they are defined as follows.
Set1: Tripping of the circuit breaker cb1 to simulate the condition of islanding of the DG with the PCC-LVbus loads.
Set2: Tripping of the circuit breaker cb2 (isolating the PCC-LVbus loads) to simulate disturbances on the DG.
Set3: Tripping of the circuit breaker cb3 to simulate the islanding of the DG without the PCC-LVbus loads.
Set4: Three-phase fault on the PCC-HVbus with instantaneous (1 cycle) fault-clearing time by the cb1, which in turn causes islanding of the DG.
Set5: Sudden decrease of the loading on the target distributed resource by 40%.
Set6: Tripping of the largest distributed resource within the DG other than the target one.

Each set of these events is simulated under different EPS and DG operating states. The EPS operating states are: normal system loading, minimum system loading and maximum system loading. Similarly, the DG operating states include: normal PCC-bus loading, minimum PCC-bus loading and maximum PCC-bus loading. The possible combinations of these operating states are given as follows:
normal EPS loading with normal PCC-bus loading;
normal EPS loading with minimum PCC-bus loading;
normal EPS loading with maximum PCC-bus loading;
minimum EPS loading with normal PCC-bus loading;
minimum EPS loading with minimum PCC-bus loading;
minimum EPS loading with maximum PCC-bus loading;
maximum EPS loading with normal PCC-bus loading;
maximum EPS loading with minimum PCC-bus loading;
maximum EPS loading with maximum PCC-bus loading.

The total number of the simulated events under the aforementioned operating states is, therefore, 54—six sets of events times nine operating states—events. 36 events (two-thirds) are used for training the classification model. The training events are indexed by two digits. The first digit describes the set number and the second digit describes the sequence of the event within this set. For example, the event E26 is interpreted as the 6th event within the Set2.

The consequences of these training events are interpreted in terms of the parameter indices shown in FIGS. 17-22. The values of these indices are computed using phasor models implemented within the multifunction protective analyzer. The time of processing the tripping decision is in the range of 45 to 50 ms (using Pentium 4, 1.60 GHz processor).

Figure 22:
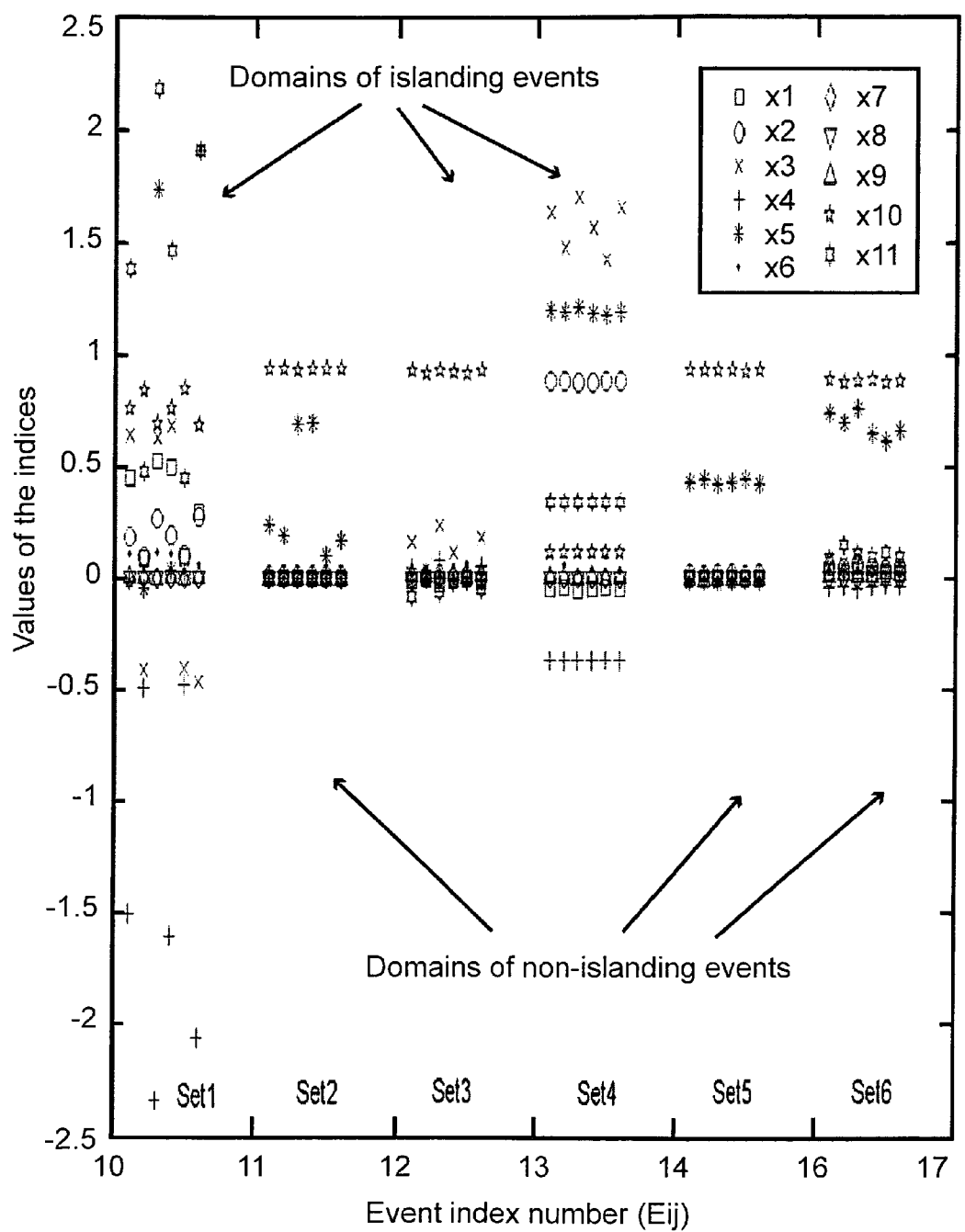
FIG. 22 shows values of the indices at the distributed resource ($DR_x$) under all training events including islanding and non-islanding events where actual values of the index $x_3$ are scaled by 0.05 and for $x_5$ are scaled by 0.1.

FIG. 22 shows all of the indices that are used to build the classification model of the relay at the target distributed resource. This Figures also demonstrate the increased sensitivities of the indices under Set1 and Set4 events with respect to the other Sets of events and, therefore, both Set1 and Set4 events provide significant separations between the islanding and non-islanding states.

Figure 21:
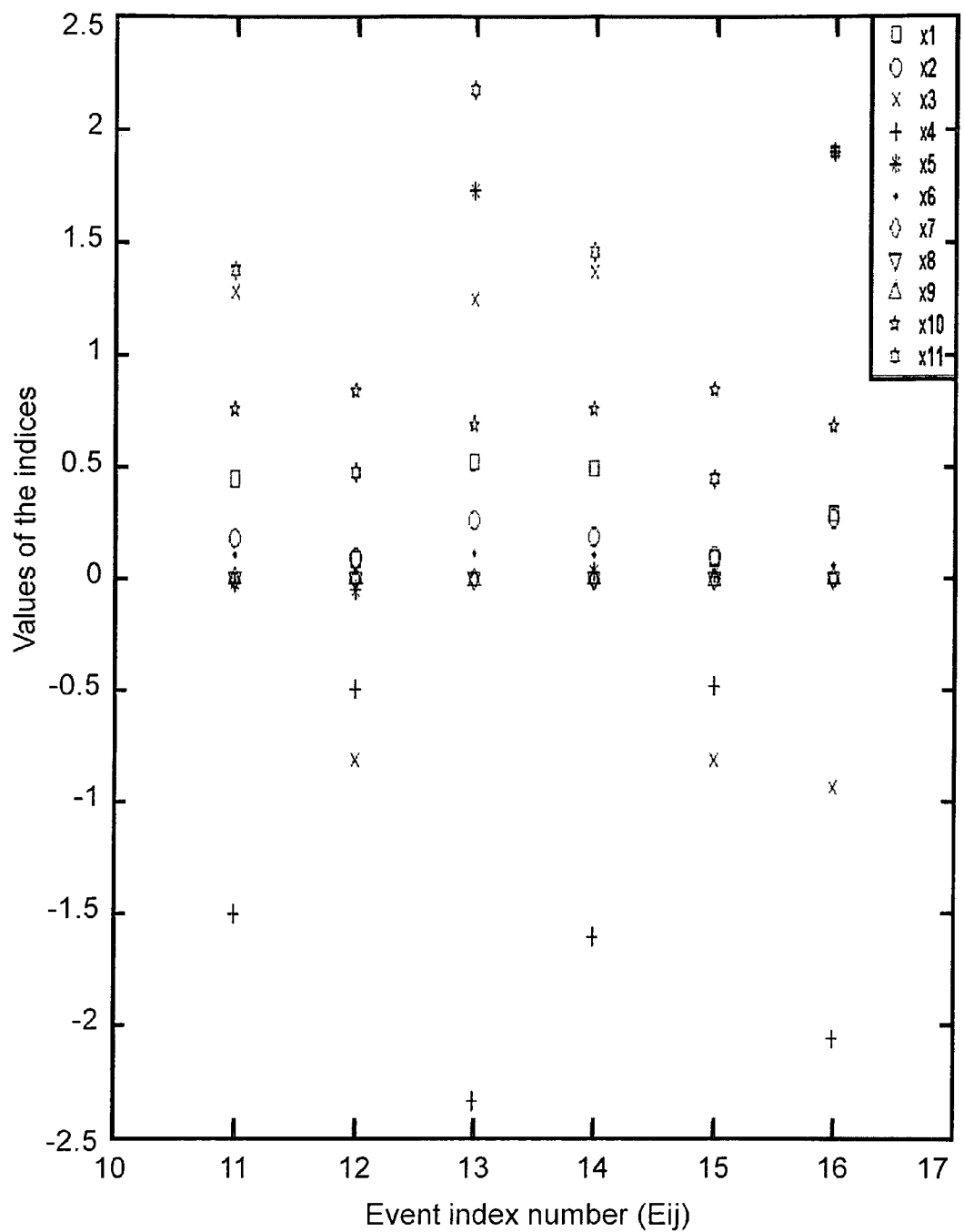
FIG. 21 shows values of the indices at the distributed resource ($DR_x$) under the Set1 islanding events where actual values of the indices $x_3$ and $x_5$ are 10 times the values shown.

In FIGS. 17-20, the variations of the given indices are plotted for all training events. FIG. 21 shows the values of all indices under the islanding events defined within the Set1. This figure also demonstrates the effect of different system operating conditions on the sensitivities of the indices.

Figure 23:
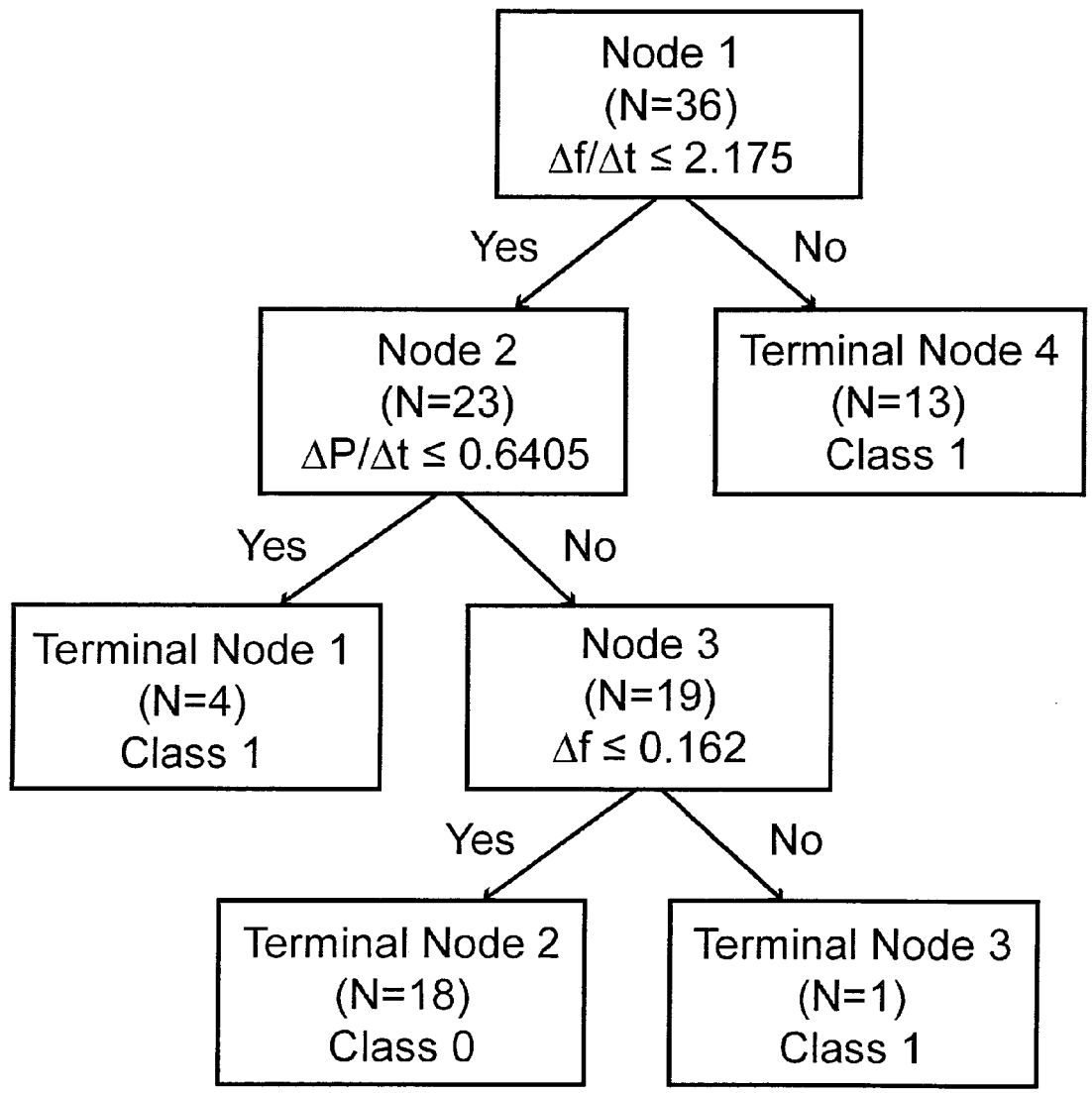
FIG. 23 shows a classification tree topology for the target islanding relay $DR_x$; Class 1 means the islanding state and Class 0 means the non-islanding state.

Based on the training data shown in FIG. 22, the CART (classification and regression tree) data mining package builds a classification model of the target relay. The tree structure of this classification model is shown in FIG. 23. This Figure comprises 3 nodes and 4 terminal nodes. In node 1, for example, the index is $\Delta f/\Delta t$ and the training cases are N=36. At the top of the tree, the value of the $\Delta f/\Delta t$ is first compared with the threshold value 2.175 Hz/s and it will split into two descendent subsets. Those subsets that are split, in this case terminal nodes 1, 2, 3 and 4 are called terminal nodes.

Each terminal node is designated by a class label. There are two class labels in this Figure, namely class 1 indicating islanding detection and class 0 indicating non-islanding detection. This Figure also provides some interesting insight into the islanding detection in that all cases with greater than 2.175 Hz/s are predicted islanding state. For cases with less than 2.175 Hz/s, the classification depends on other values.

In the methodology of the CART, once the maximal tree of the classification model is grown and a set of sub-trees is derived from it, the CART determines an approximately best tree by testing for error rates or costs. The test sample is used to estimate the rate at which cases are misclassified. The misclassification error rate is calculated for the largest tree and also for every sub-tree. The best sub-tree is the one with the lowest cost, which may be a relatively small tree. Of course, sub-optimal trees are also usable and become even more so as possessing speed requirements diminish relative to available processors.

Table 1 summarizes the results of the 18 sample testing events that were randomly simulated and the resulting parameter indices were classified by the data mining classification model.

The output decisions of the classification are indicated in the column "Class" of the Table 1. Class 1 means islanding state and Class 0 means non-islanding state.

In this case study, it was assumed that the cost of misclassifying non-islanding as islanding is the same as the cost of misclassifying islanding as non-islanding. Although the assumption of equal costs for all errors is often appropriate, in some circumstances, non-equal costs are also needed to describe a decision problem.

Table 2 lists a misclassification report that is generated by the CART for the test events. As indicated in this table, for the non-islanding events, the total number of tested cases is 18 and the misclassification rate is 0%. In other words, there is no risk of false detection in case of non-islanding conditions (the rate-of-false-detection is 0%). For the islanding events, on the other hand, there were 15 events classified correctly as islanding conditions and 3 events were misclassified as non-islanding conditions. Thus the misclassification rate in this case is 16.67%.

This means that the rate-of-false-dismissal (or risk of missing an islanding condition) is 16.67%. One possible source of this misclassification is due to the reduced sensitivities of the indices to the islanding events E32, E34, and E35, which can be noticed very clearly in FIG. 22. It is also interesting to note that the relative sensitivities of the parameter indices of the Set3 compared with the other sets of the islanding events (such as Set1 and Set4) are very low to provide significant separation between the two classes. The main cause of this low sensitivity is the fact that the events of the Set3 do not island the DG with the loads of the PCC bus (see the definition of Set3 earlier in Section V-A).

Although, the rate-of-false-detection in the testing set is zero, it should be noted that the system resulted in false alarm (false detection of non-islanding condition) when a double contingency was simulated. This double contingency was a combination of: a) the event E69 (tripping of the largest distributed resource within the DG other than the target one under maximum system loading condition) and b) increase of the loading of L3 by 125%. While the probability of occurrence of such contingencies is very low, false alarm, in general, could be reduced by increasing the number of events in the training sets to cover more or all possible operating states.

The training cases preferably cover most expected circuit configurations. In the implementation of the proposed islanding detection relay, current and voltage are measured and processed to extract the values of the 11 indices used to detect islanding.

The detection process is implemented, for example, on existing DSPs or microcontrollers. The speed of response of the relay is expected to be fast, given the fact that mostly logic functions are involved. In the case of significant changes in the circuit topology or the addition of new DG, new simulations are preferably performed and the relay reconfigured for the resulting data.

Another issue in evaluation and detection of islanding is threshold determination. Developments in prior art techniques have successfully overcome reduced sensitivities during the islanding operations and, therefore, allow detection of islanding under minimum detectable zones. Nevertheless, the determination of threshold settings of these relays plays an important role in the overall design, operation, and performance characteristics of islanding detection. In addition, proper threshold settings of these relays increases sensitivity, security, and dependability of the islanding detection relays.

According to an embodiment, a new approach for determining islanding threshold settings is shown. Accordingly, decision-tree data mining is used to extract threshold settings of islanding relays from the analyses of system parameters (voltage, current, power, power factor, frequency, etc.) that are determined for any given DR of the DG interconnection under study. The determination of these parameters is performed by analyzing possible events for defining boundary limits of islanding characteristics. Preferably, most or all possible events of this type are analysed. Advantageously, when sufficient analysis is done, the resulting thresholds allow detection of islanding operations under: 1) approximately minimum detectable zones, 2) distributed generations with multiple distributed resources, 3) diverse distributed resource technologies, 4) a system under various operating conditions, and 5) a system operating on different network topologies.

The relay threshold settings imply the determination of approximately optimal pickup values of islanding relay setting parameters in order to secure the detection of islanding conditions. The security of detection entails avoiding false detection as well as false dismissal. False detection is, simply, misclassifying non-islanding as islanding conditions. The false dismissal or missing of an islanding condition, on the other hand, is misclassifying islanding as non-islanding conditions.

FIG. 24 shows a typical system parameter (X) such as voltage or current at a given location in a network. The attributes of X could include threshold settings, pre-disturbance measured quantity, steady-state disturbance measured quantity, and the peak instantaneous value. The threshold value is determined so that the relay can detect all possible islanding conditions and that the false dismissal rate is preferably minimized to zero. A safety margin (SM) between the threshold value and the pre-disturbance value is required to avoid any false detection in case of non-islanding conditions. A relay trip signal is issued only when the measured value exceeds the threshold and holds for a preset time-delay.

Therefore, to determine this approximately optimal threshold setting that indicates islanding conditions, a comprehensive approach based on analyses of events and consequences and data mining processing is performed. The approach is based on two-phase procedure. In the first phase, a classification model for an islanding relay at a given DR location is constructed from the patterns of the system parameters at its location. These patterns are generated from training events (called setting events). In the second phase, the threshold settings of these parameters are extracted from the decision rules that are generated by the constructed classification model.

This concept is illustrated by the block diagram of FIG. 25 in which the construction of the islanding classification model is done by induction process and supervising learning process using decision-tree data mining. Then by applying deduction process, the threshold setting values are extracted from the decision rules (or setting rules) that are generated by the islanding classification model. The main components of the proposed approach shown in FIG. 25 are the events generator and the islanding classification model.

The event generator creates events (called setting events) that are used to construct the islanding classification model. In this proposed approach, extensive setting events are simulated offline in order to capture the essential characteristics of the system behavior that produce this classification model. The definition of these events are based on four main sources, namely: 1) the protection requirements in terms of sensitivity, reliability, and security; 2) the setting parameters that are recommended by most of the manufacturers of islanding relays; 3) the operational requirements in the IEEE1547 standards; and 4) possible operating network topologies. The setting events are optionally categorized into faults and switching actions under different network operating states. The following is a list of some possible events:

all possible tripping of circuit breakers that are liable to result in the conditions of islanding formation;
opening of any breakers between the EPS and the DG;
loss of power on the PCC bus (point-of-common-coupling between the EPS and the DG);
islanding formed in EPS transmission system;
events that could trip all breakers and reclosers that could island the DG under study;
removing EPS network capacitor, if any.
loss of any parallel lines of the EPS;
faults on the PCC bus with instantaneous and delayed fault-clearing times;
abrupt change in the load of DR.

Furthermore, these events are simulated under the following possible network operating loading:
different EPS operating loading, including: normal system loading, minimum system loading, and maximum system loading;
different DG interconnection operating loading, including: normal DG loading, minimum DG loading, and maximum DG loading;
different operating loading of the DR under study;
minimum interchange of power between the EPS and the DG interconnection.

The classification task is a supervised learning problem, in which the output information is a discrete classification, i.e., given an islanding operation and its input system parameters, the classification output value is one of the possible mutually exclusive classes of the problem. In this paper, the classes are islanding and non-islanding. The aim of the classification task is to discover some form of relationship between the input system parameters and the output classes so that the discovered knowledge can then be used to estimate the threshold settings of islanding relays. These relationships are generated in the form of setting rules indicated in FIG. 25.

The system parameters could include all sensitive system indices that are affected by islanding operations and that are measured locally. The following four system parameters have been chosen to illustrate the modeling of the proposed approach. The chosen system parameters, the corresponding pattern vector, and the data model within the pattern database of the decision tree are given by the following mathematical expressions:

$$X_i = \left\{ f_i, \quad v_i, \quad \left(\frac{\Delta f}{\Delta t}\right)_i, \quad \left(\frac{\Delta f}{\Delta t}\right)_i \right\} \tag{17}$$

$$\{(X_i, y_i), \quad i = 1, 2, L, N\} \tag{18}$$

where
i event index;
N total number of events;
Xi pattern vector of the data model of the th event;
fi frequency variation (Hz) of the th event;
Vi voltage variation (p.u.) of the th event;
($\Delta f/\Delta t$)i rate-of-change of frequency (Hz/s) for th event;
($\Delta P/\Delta t$)i rate-of-change of the power (MW/s) for th event.
$y_1, y_2, \ldots y_i \ldots y_n$ are class variables corresponding to each simulated event. The possible values of any class variables can be given by the binary set $\{c_0, c_1\}$ such that: $y_i = c_0 = 0$, for non-islanding condition, and $y_i = c_1 = 1$ for islanding condition.

In general form X, the pattern database of the whole data model that contains all N events and takes values from the n-dimensional real set $\{R^n\}$. It is expressed in terms of its system parameters (or features) by the following expression:

$$X = \{X1, X2, X3, X4\} \tag{19}$$

where $$X1 = \{X_i(1), i=1, 2, \ldots, N\} \tag{20}$$

$$X2 = \{X_i(2), i=1, 2, \ldots, N\} \tag{21}$$

$$X3 = \{X_i(3), i=1, 2, \ldots, N\} \tag{22}$$

$$X4 = \{X_i(4), i=1, 2, \ldots, N\} \tag{23}$$

Figure 26:
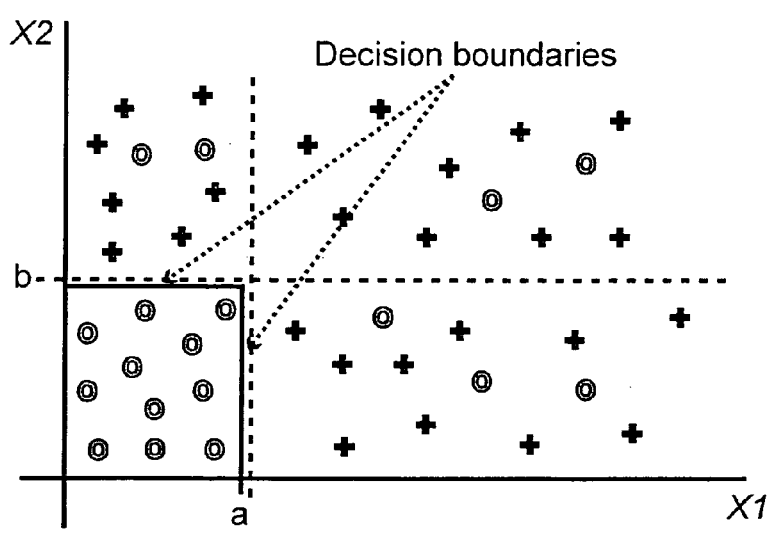
FIG. 26 shows two-dimensional system parameters space (X1 and X2) with two classes ($c_1$ and $c_0$). Samples from the two classes are designated + for islanding condition or class $c_1$ and o for non-islanding condition or class $c_0$. The threshold settings "a" and "b" are for X1 and X2, respectively.
Figure 27:
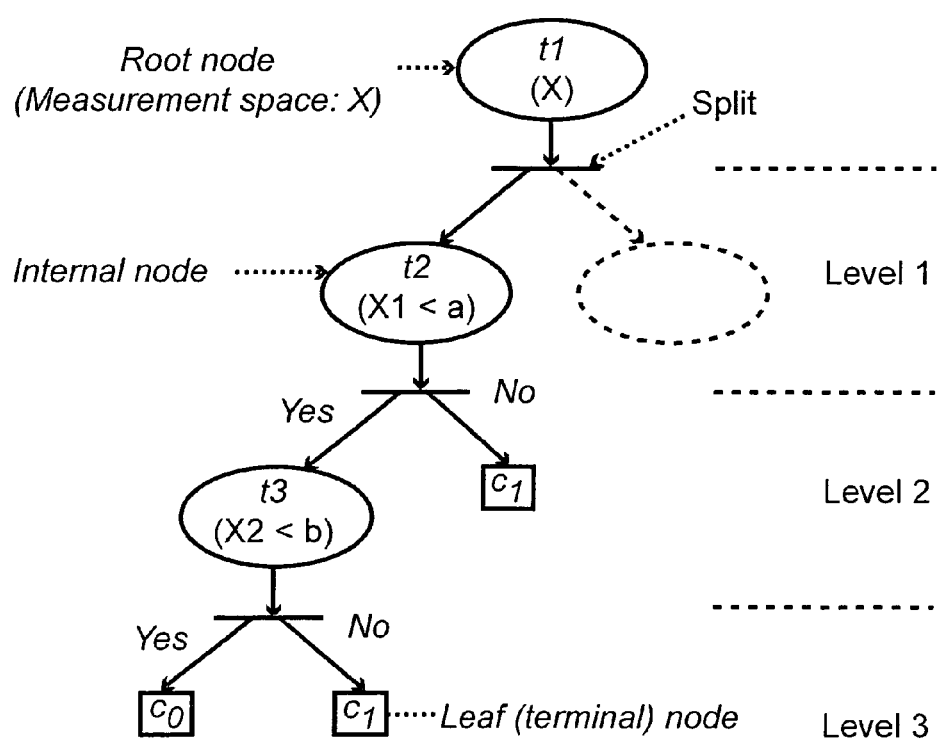
FIG. 27 shows a decision tree (T) for the decision boundaries of FIG. 26. The threshold settings "a" and "b" are extractable from this tree.

FIG. 26 shows possible binary partitions to the two-dimensional system parameter space (X1 and X2) with two classes. The decision boundaries are designated by the solid line with the approximately optimal threshold settings of "a" and "b", respectively. The decision tree corresponding to these decision boundaries is shown in FIG. 27. This figure is characterized by: 1) each new threshold defines a split, 2) each split defines two nodes, and 3) the last nodes, which define the decision boundaries, are called terminal nodes or leaves.

In order to determine these approximately optimal threshold settings, the approximately optimal right-sized decision tree is constructed from the data set. In decision-tree data mining, many decision trees can be constructed from a given set of data. Though some of these trees are more accurate than others, finding the optimal tree is practically difficult because of large size of search space. That said, in many instances optimal tree design is obviated because sufficient processing power allows for traversal of suboptimal trees with sufficient performance for many applications. Further, algorithms have been developed and are known to construct decision trees with reasonable accuracy. These algorithms use strategy that grows a decision tree by making a series of locally optimum decisions about which feature (system parameter) to use for portioning the data set. The right-sized (or optimal) decision tree is then constructed according to the following optimization problem:

$$\hat{R}(T_{k0}) = \min_k \{\hat{R}(T_k)\} \tag{24}$$

$$\hat{R}(T) = \sum_{t \in \tilde{T}} \{r(t)p(t)\} \tag{25}$$

where
$\hat{R}(T_k)$ misclassification error rate of the tree $T_k$.
$T_{k0}$ optimal decision tree that minimizes the misclassification error $\hat{R}(T_k)$.
T binary tree □$\{T_1, T_2, \ldots, t_1\}$
k tree index number
t node in a tree
$t_1$ root node
$\tilde{T}$ set of terminal nodes of the tree T
r(t) resubstitution estimate of the misclassification error of a case in node t.
p(t) probability that any event falls into node t.

Any binary decision tree is a collection of nested binary partitions and can be represented in the recursive form shown in Equation 7.

Equation 7 defines the decision tree in terms of pattern lattice created by partitioning of the features plane shown in FIG. 26. The equation states the lattice can be binary partitioned on the feature axis into mutually exclusive left and right sets as also depicted in FIG. 27. The left set includes lattice elements with feature values smaller than the threshold value. While, the right set includes lattice elements with feature values larger than the threshold value. As noted above a binary partition can also be denoted by a five-tuple.

The generated decision rules are in the form if antecedent, then consequent. The antecedent comprises the feature values from the branches taken by the particular path through the tree, while the consequent comprises the classification value for the target variable given by the particular leaf node. Each decision rule is, in fact, a function that maps the real set into a class label. The misclassification rate of the generated rule denoted by is $$R(d) = \frac{1}{2}\sum_{n=1}^{N} X(d(X_n) \neq y_n) \tag{27}$$

Figure 28:
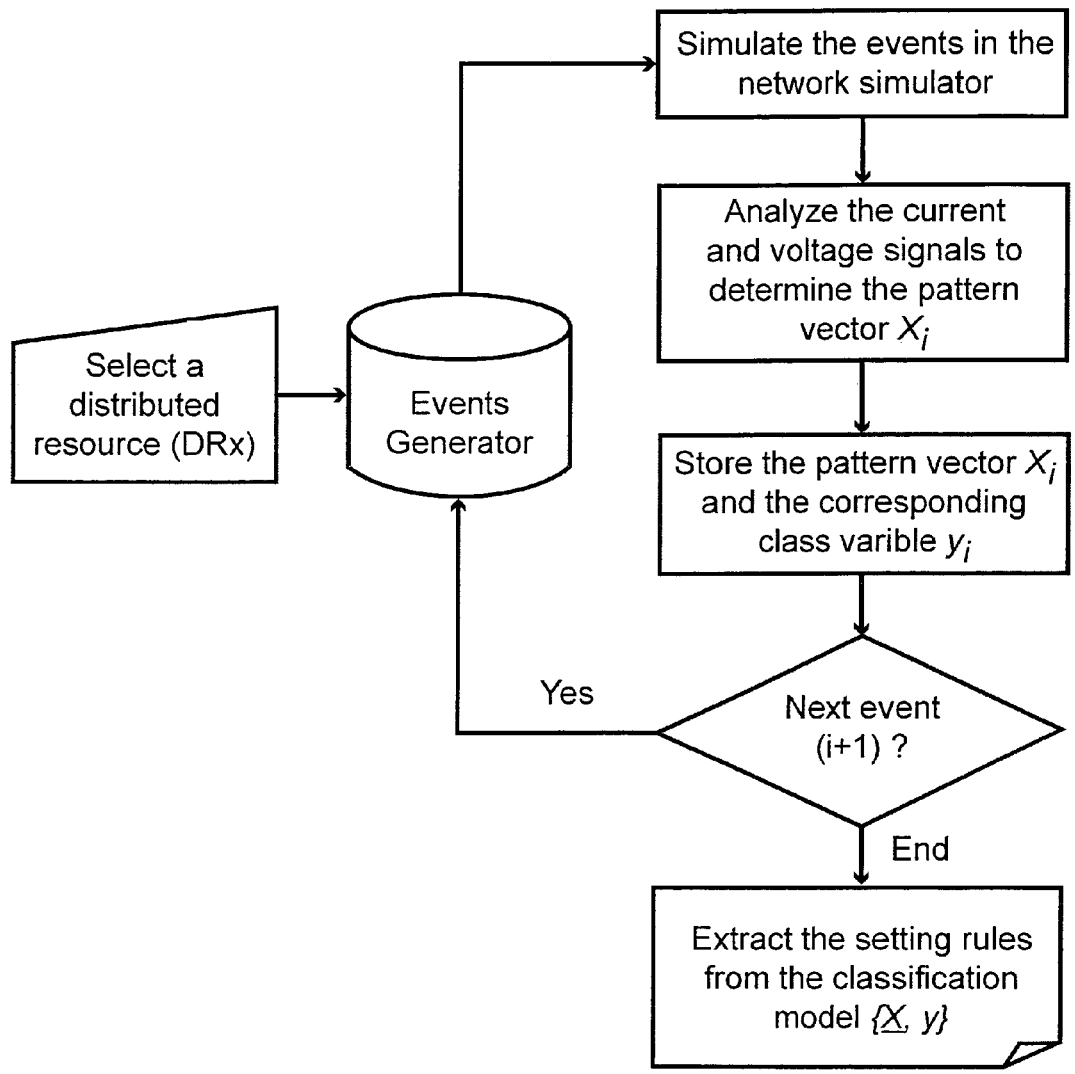
FIG. 28 is a flowchart of the methodology of an embodiment of the invention.

The embodiment starts with a given DG interconnection for which islanding threshold settings are to be set for any distributed resource, such as distributed resource (DRx). The tasks of this methodology are flow-charted in FIG. 28 and summarized as follows:

1) Select DRx in which the islanding threshold is to be set.
2) Simulate the events associated with the selected DRx in the network simulator. These events are generated by an events generator.
3) Analyze the current and voltage signals at DRx for every simulated event to determine the values of the system parameters (or pattern vector in decision-tree terminology) that correspond to the ith event.
4) Store the pattern vector $X_i$ and the corresponding class variable $Y_i$ in the pattern database of the decision-tree data mining.
5) Repeat steps 2 to 4 for all N prescribed events.
6) Compile and execute the $X_i$ and $Y_i$ to construct the classification data model to generate the setting rules.
7) Extract the setting rules from the constructed model.

The output data of this methodology is a set of setting rules that define threshold settings of the system parameters of the islanding relay at the distributed resource location (DRx).

Figure 29:
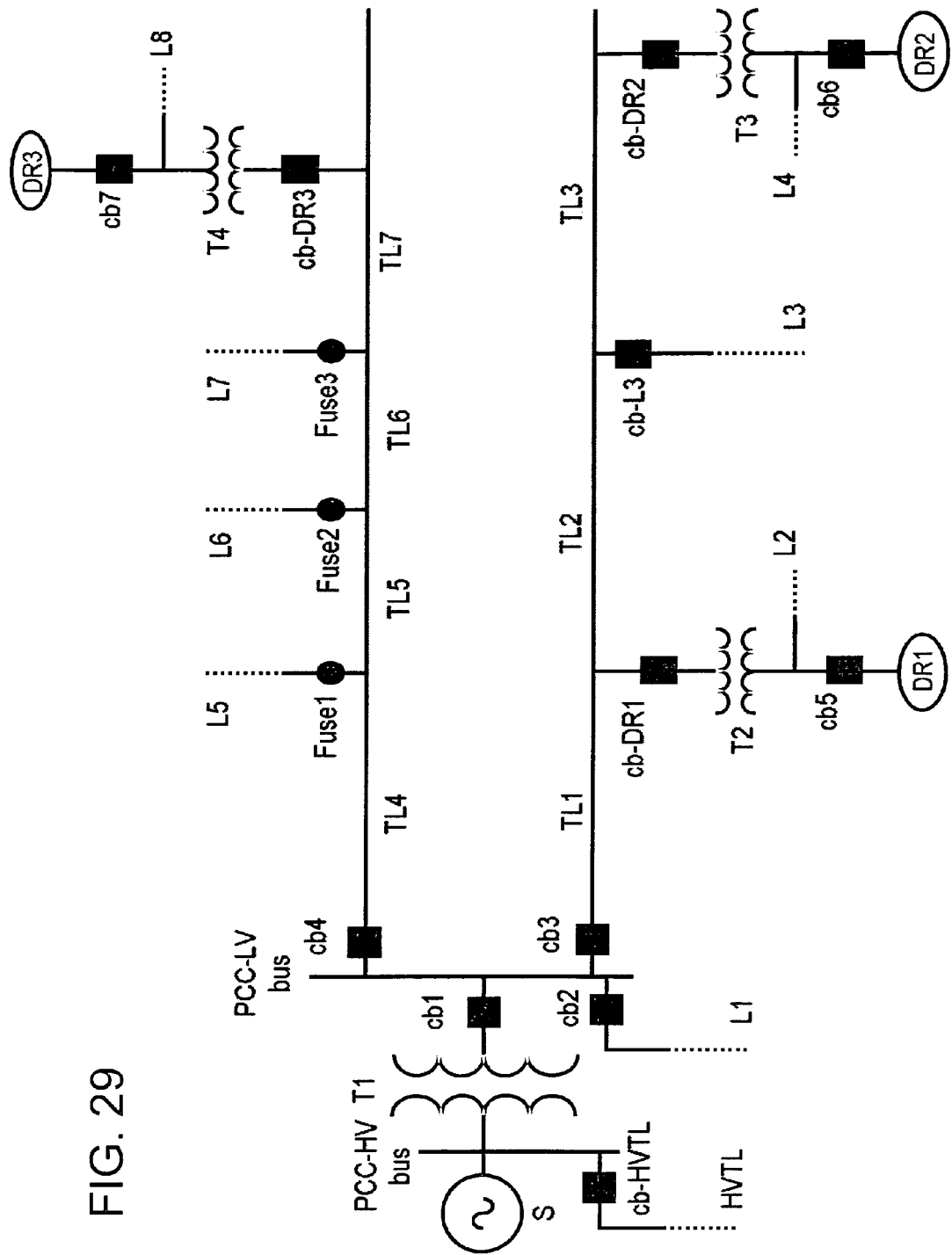
FIG. 29 shows a typical distributed generation with S (equivalent system), DR (distributed resource), T (power transformer), L (load), G (generator), cb (circuit breaker), PCC bus (point of common coupling), LV (low voltage), and HV (high voltage).
Figure 30:
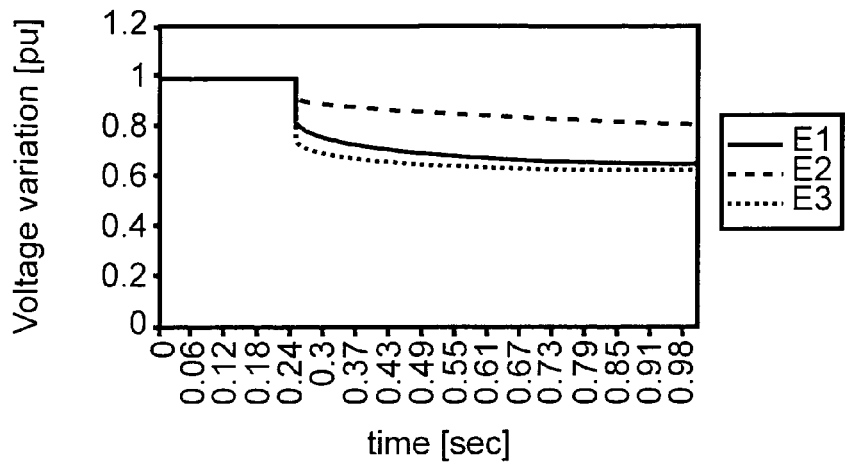
FIG. 30 shows a voltage at the distributed resource (cb-DR1) under islanding events E1, E2, and E3.
Figure 31:
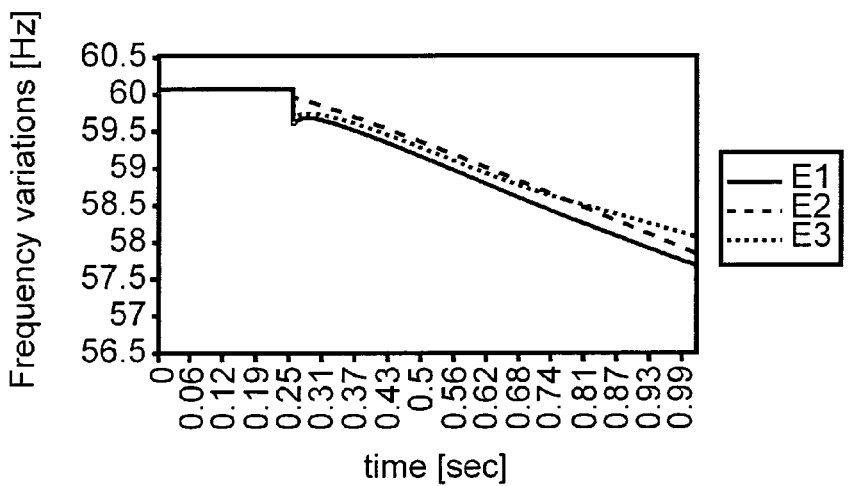
FIG. 31 shows a frequency at the distributed resource (cb-DR1) under islanding events E1, E2, and E3.
Figure 32:
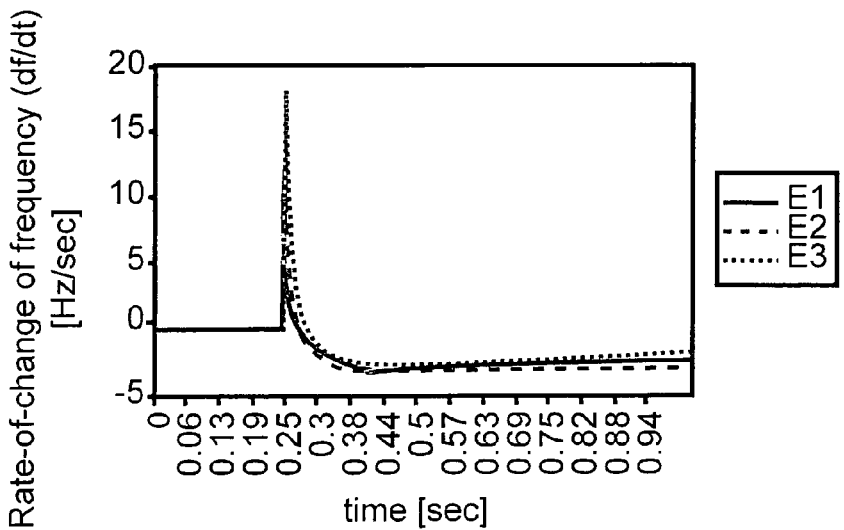
FIG. 32 shows a rate-of-change of frequency at the distributed resource (cb-DR1) under islanding events E1, E2, and E3.
Figure 33:
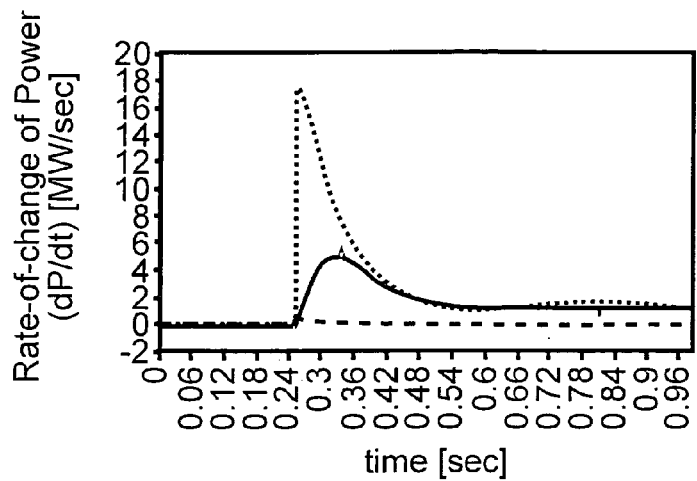
FIG. 33 shows a rate-of-change of power at the distributed resource (cb-DR1) under islanding events E1, E2, and E3.
Figure 34:
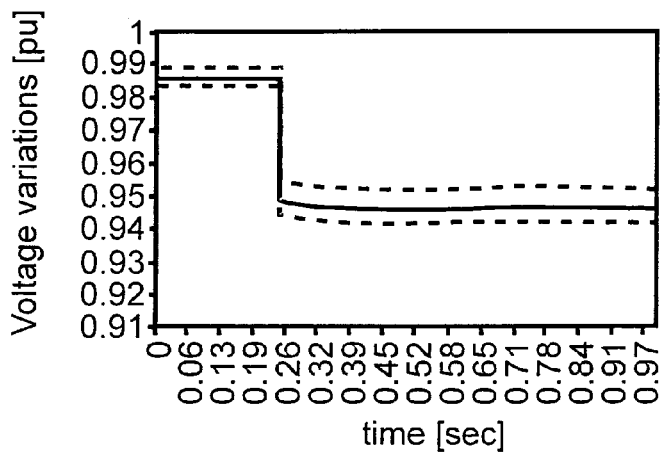
FIG. 34 shows a voltage at the distributed resource (cb-DR1) under non-islanding events E10, E11, and E12.
Figure 35:
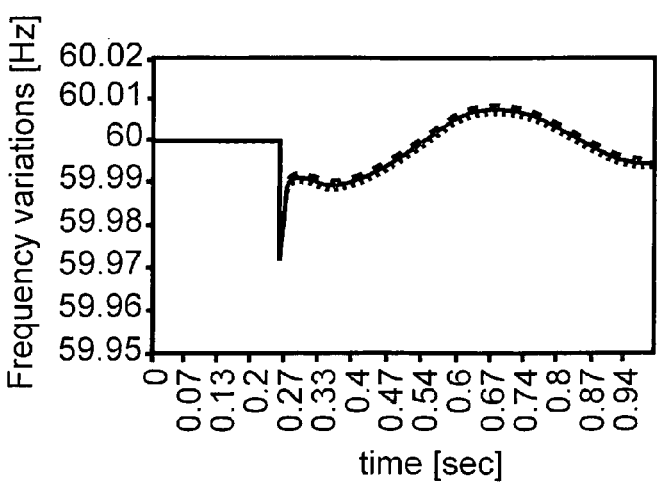
FIG. 35 shows a frequency at the distributed resource (cb-DR1) under non-islanding events E10, E11, and E12.
Figure 36:
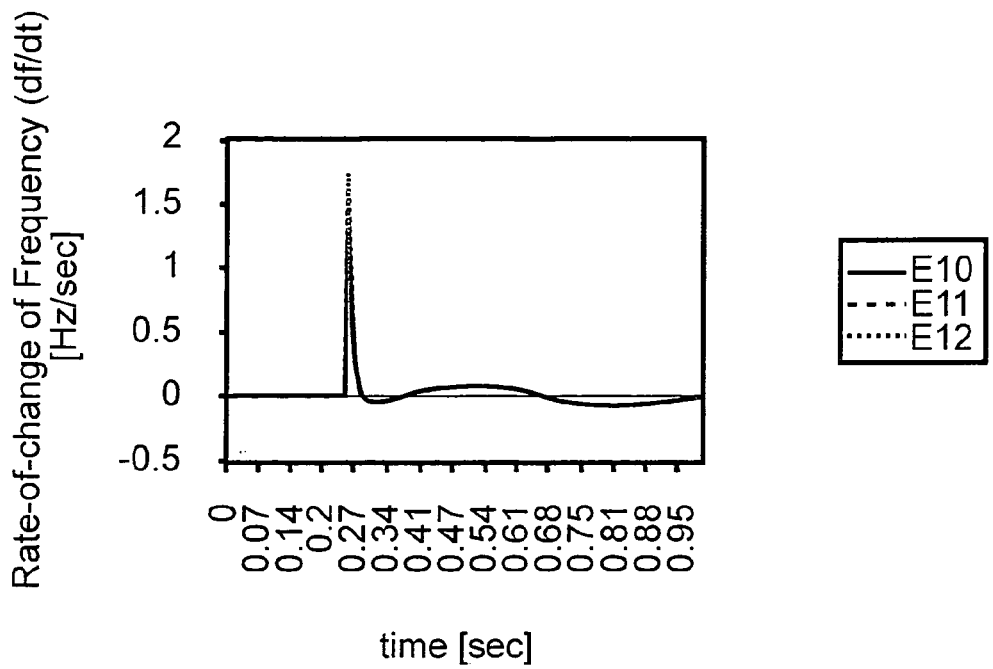
FIG. 36 shows a rate-of-change of frequency (df/dt) at the distributed resource (cb-DR1) under non-islanding events E10, E11, and E12.
Figure 37:
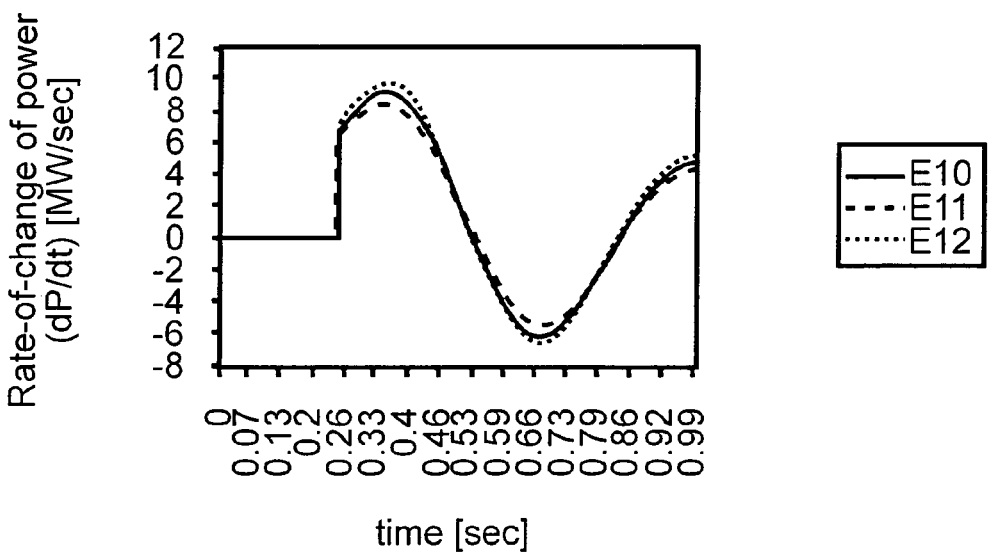
FIG. 37 shows a rate-of-change of power at the distributed resource (cb-DR1) under non-islanding events E10, E11, and E12.

A sample application example is presented to demonstrate the proposed approach for a target distributed resource, DR1, of a typical distributed generation interconnection shown in FIG. 29.

In this application example, 72 setting events were used in this embodiment by the event generator. Fifty percent (or 36 events) of these events are islanding events, and the other 50% are non-islanding events.

These 72 events were generated by a combination of eight possible events under nine network operating loadings. The eight events are: 1) tripping of cb1; 2) tripping of cb3; 3) tripping of DR2 (largest distributed resource on the same circuit as of the target resource DR1); 4) three-phase fault on PCC-LV bus and cleared by cb1, cb3, and cb4; 5) three-phase fault on line TL1 cleared by disconnecting TL1 from both sides; 6) three-phase fault on load circuit L3 cleared by cb-L3; 7) three-phase fault on adjacent circuit TL4 cleared by cb4; and 8) three-phase fault on circuit HVTL cleared by cb-HVTL. The nine operating loadings are: normal EPS (electric power system) loading, minimum EPS loading, maximum EPS loading, normal DG loading, minimum DG loading, maximum DG loading, nominal DR1 generation (85%), minimum DR1 generation (50%), and maximum DR1 generation (100%). Please note that events 1, 2, 4, and 5 are islanding events while events 3, 6, 7, and 8 are non-islanding events. These events are used to construct the data model for setting the islanding relay at cb-DR1 (DR1 circuit breaker). A sample list of 12 events is defined in Table 3. The variations in the system parameters due to events E1 through E3 and events E10 through E12 are shown in FIGS. 30-37. It should be noted that the settings of all protection devices were taken into account when running the events. In this embodiment, it was assumed that the protection devices at breakers cb1, cb2, cb3, cb4, and cb-L3 are inverse definite minimum time lag relay (IDMT) plus instantaneous element with circuit-breaker interruption time of five cycles. The proposed approach assumes that the protection devices are already well coordinated. Therefore, the coordination between protection devices is not part of this approach.

Furthermore, it was considered that the triggers of islanding condition are simultaneous (i.e., triggering islanding when all threshold settings of X1, X2, X3, and X4 are reached). Consequently, the IEEE 1547 operating requirements in terms of voltage and frequency limits were not considered in the definition of the generated event.

Once the system parameters for all events are determined for the islanding relay at cb-DR1, the corresponding pattern data model is then constructed. In fact, the data mining approach is very flexible in selecting (from the constructed data file) the type and number of the system parameters (or the dependent variables) to be included in order to generate the corresponding data mining model. In other words, once the data file is created from the analyses of events, any parameter(s) can be selected, as required, from this data file during the setup of the data mining model. In this embodiment, this data model is constructed from a snapshot of average value of each system parameter after eight cycles from the initiation of each event.

Figure 38:
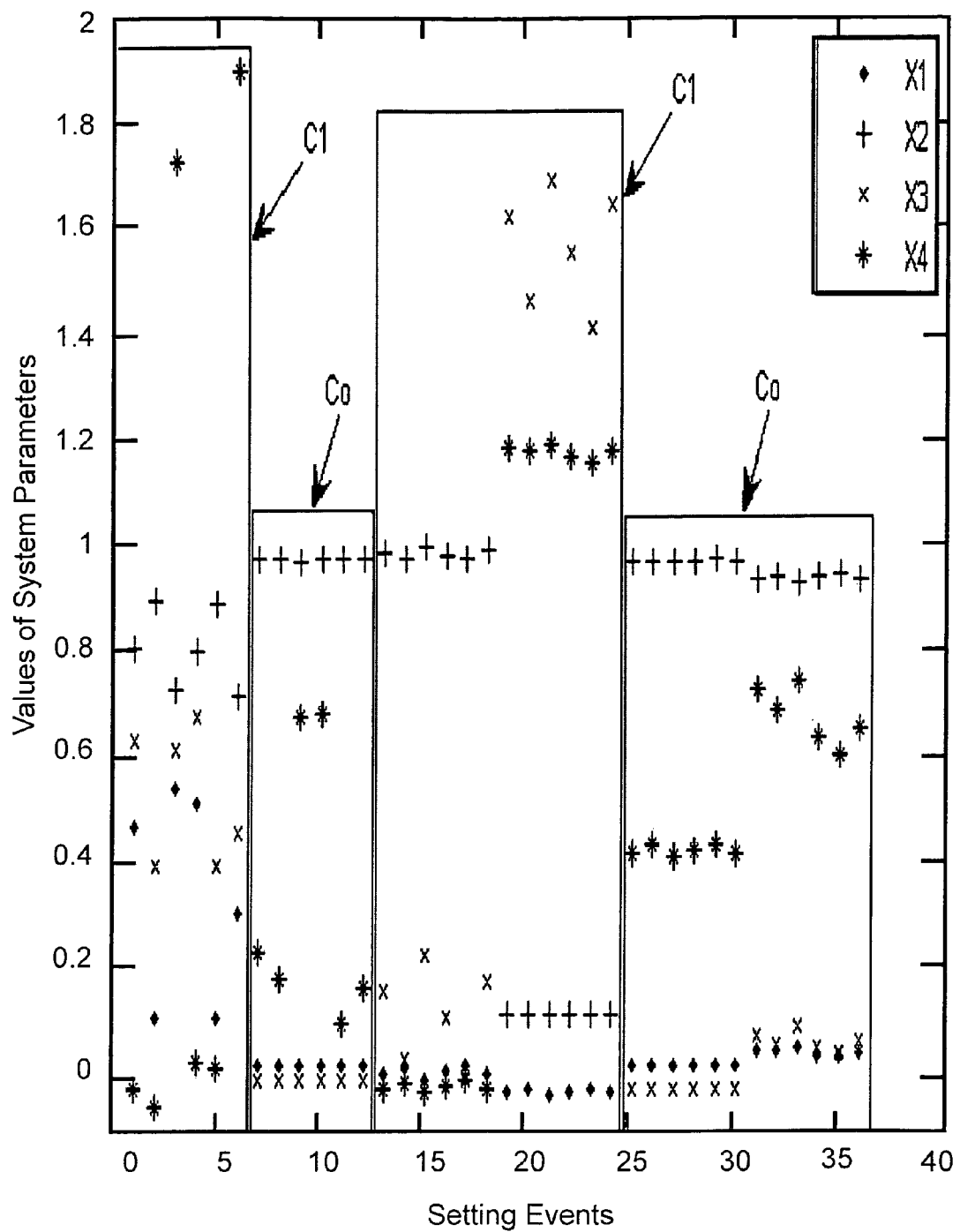
FIG. 38 is a plot of sample data (corresponding to 36 events) from snapshot data file. Symbols are: X1 (frequency deviation) [Hz]), X2 (voltage [p.u.]), X3 (rate-of-change of frequency [Hz/s]), X4 (rate-of-change of power [MW/s]), Co (non-islanding condition), and C1 (islanding condition). The actual values of the system parameters X3 and X4 are scaled by 0.05 and 0.1, respectively.

This is to ensure that the transients on the system parameters are vanished and the steady-state values are outputted to a snapshot data file. The observation time of eight cycles was chosen so that the relay operating time is kept low and that the parameters are measured accurately. A target tripping time for islanding is to be not more than 0.125 s, as required by some utilities. However, the application of the proposed approach is applicable to any operating time, depending on the relay under study. A plot of sample data corresponding to 36 events from this snapshot data file is shown in FIG. 38.

The snapshot data file is then arranged in a data model format suitable for decision-tree data mining manipulations. Based on this data model, the classification and regression tree (CART) data mining package compiles and executes this data model to construct the classification model for the islanding relay at cb-DR1. The decision rules extracted from this classification model specify the optimal threshold settings of the four system parameters as listed in Table 4. In this table, these threshold set points separate between islanding and non-islanding operations.

As an example, if the measured voltage at this location is more than 0.924 p.u., then the status of islanding will depend on the values of the other measured parameters. On the other hand, if the measured voltage is less than 0.924 p.u., then islanding condition is detected at this location.

The data mining model of the case study has been tested with 36 unforeseen cases (18 as non-islanding cases and 18 as islanding cases). For the non-islanding cases, the misclassification rate is 0%. In other words, there is no risk of false detection in case of non-islanding conditions. For the islanding cases, on the other hand, there were 17 events detected correctly as islanding conditions, and one event was undetected. Thus, the misclassification rate in this case is 5.55%. This undetected event is caused by: the tripping of the circuit breaker cb3 under no loading on PCC-LV bus MW. In this regard, the main objectives of the proposed approach are: 1) to detect correctly as much of the training cases as possible, 2) to generalize beyond the training cases so that unseen cases could be classified with as high a degree of accuracy as possible, and 3) to be easy to update as more training cases become available.

Effects of location on the threshold settings of the islanding scheme were evaluated using another location at DR2. With similar sets of events but applied for DR2, the settings for the four system parameters are given in Table 5. The table shows slightly different settings from the DR1 settings. It indicates that the impact of location has effect on threshold settings and should be considered to best implement the embodiment.

Though the above embodiments are described with reference to a decision tree implementation, it is also envisaged that a neural network or another trained model is useable with the disclosed embodiments. Further, though the training process described involves providing and simulating events, it may be possible in some cases to generate the events within the electrical power system network and to measure the results in order to form the model.

Numerous other embodiments may be envisaged without departing from the spirit or scope of the invention.

TABLE 1

| Event No. | X1 | X2 | X3 | X4 | X5 | X6 | X7 | X8 | X9 | X10 | X11 | Class |
|---|---|---|---|---|---|---|---|---|---|---|---|---|
| E17 | 0.44 | 0.18 | 11.5 | −1.4 | −0.15 | 0.10 | 2.0e−5 | 1.4e−4 | 0.0086 | 0.7597 | 1.381 | 1 |
| E18 | 0.09 | 0.09 | 7.5 | −0.45 | −0.45 | 0.29 | 2.0e−5 | 1.4e−4 | 0.0063 | 0.842 | 0.4772 | 1 |
| E19 | 0.521 | 0.25 | 11.8 | −2.3 | 16 | 0.11 | 2.0e−5 | 1.4e−4 | 0.0018 | 0.6916 | 2.177 | 1 |
| E27 | 1.0e−4 | 0.012 | 1.9e−5 | 1.5e−5 | 2.1 | 1.0e−5 | 2.0e−5 | 1.4e−4 | 1.0e−5 | 0.9332 | 1.0e−5 | 0 |
| E28 | 1.5e−4 | 0.011 | 1.8e−5 | 1.5e−5 | 1.8 | 1.0e−5 | 2.0e−5 | 1.4e−4 | 1.0e−5 | 0.9347 | 1.0e−5 | 0 |
| E29 | 1.7e−4 | 0.016 | 1.9e−5 | 1.6e−5 | 6.0 | 1.0e−5 | 2.0e−5 | 1.4e−4 | 1.0e−5 | 0.9294 | 1.0e−5 | 0 |
| E37 | −0.014 | 0 | 3.3 | 0.049 | −0.145 | 0.012 | 2.0e−5 | 1.4e−4 | 0.0196 | 0.9254 | −0.084 | 1 |
| E38 | −0.001 | 0.01 | 0.75 | −5e−4 | −0.06 | 0.0043 | 2.0e−5 | 1.4e−4 | 0.0108 | 0.9157 | 0.0005 | 1 |
| E39 | −0.022 | −0.005 | 4.6 | 0.075 | −0.19 | 0.014 | 2.0e−5 | 1.4e−4 | 0.0295 | 0.9252 | −0.061 | 1 |
| E47 | −0.048 | 0.85 | 31 | −0.35 | 11 | 0.029 | 5.0e−4 | 3.0e−3 | 0.0086 | 0.1145 | 0.3408 | 1 |
| E48 | −0.042 | 0.852 | 28 | −0.345 | 10.9 | 0.058 | 5.0e−4 | 3.0e−3 | 0.0063 | 0.1144 | 0.3437 | 1 |
| E49 | −0.051 | 0.855 | 32.5 | −0.35 | 11.4 | 0.023 | 5.0e−5 | 3.0e−3 | 0.0018 | 0.1175 | 0.344 | 1 |
| E57 | 0.0016 | 0.019 | −0.374 | −0.01 | 4.1 | −0.001 | 2.0e−5 | 1.4e−4 | 1.0e−5 | 0.9257 | 0.0104 | 0 |
| E58 | 0.0015 | 0.018 | −0.39 | −0.011 | 4.3 | −0.002 | 2.0e−5 | 1.4e−4 | −0.006 | 0.9266 | 0.0113 | 0 |
| E59 | 0.0017 | 0.02 | −0.35 | −0.011 | 4.05 | −0.001 | 2.0e−5 | 1.4e−4 | 1.0e−5 | 0.9277 | 0.0144 | 0 |
| E67 | 0.029 | 0.051 | 1.6 | −0.041 | 7.1 | 0.024 | 2.0e−5 | 1.4e−4 | 0.0119 | 0.8841 | 0.091 | 0 |
| E68 | 0.03 | 0.046 | 1.2 | −0.035 | 6.8 | 0.027 | 2.0e−5 | 1.4e−4 | 0.0186 | 0.8749 | 0.149 | 0 |
| E69 | 0.032 | 0.056 | 1.9 | −0.045 | 7.4 | 0.027 | 2.0e−5 | 1.4e−4 | 0.0132 | 0.8809 | 0.108 | 0 |

TABLE 2

| Actual class | Number of cases | Class 0 output | Class 1 output | Number of mis-classifications | Mis-classification rate % | Cost |
|---|---|---|---|---|---|---|
| 0 | 18 | 18 | 0 | 0 | 0 | 0 |
| 1 | 18 | 3 | 15 | 3 | 16.67 | 0.17 |

TABLE 3

| Event name | Event description | Island status |
|---|---|---|
| E1 | Tripping of the circuit breaker cb 1 under normal EPS loading (Zs = j0.02 pu) with normal PCC-bus loading (P = 0.5 pu, Q = 0.175 pu) | 1 |
| E2 | Tripping of the circuit breaker cb 1 under normal EPS loading (Zs = j0.02 pu) with minimum PCC-bus loading (P = 0.3 pu, Q = 0.105 pu) | 1 |
| E3 | Tripping of the circuit breaker cb 1 under normal EPS loading (Zs = j0.02 pu) with maximum PCC-bus loading (P = 0.625 pu, Q = 0.22 pu) | 1 |
| E4 | Tripping of the circuit breaker cb 1 under minimum EPS loading (Zs = j0.05 pu) with normal PCC-bus loading (P = 0.5 pu, Q = 0.175 pu) | 1 |
| E5 | Tripping of the circuit breaker cb 1 under minimum EPS loading (Zs = j0.05 pu) with minimum PCC-bus loading (P = 0.3 pu, Q = 0.105 pu) | 1 |
| E6 | Tripping of the circuit breaker cb 1 under minimum EPS loading (Zs = j0.05 pu) with maximum PCC-bus loading (P = 0.625 pu, Q = 0.22 pu) | 1 |
| E7 | Tripping of the DR2 distributed resource under normal EPS loading (Zs = j0.02 pu) with normal PCC-bus loading (P = 0.5 pu, Q = 0.175 pu) | 0 |
| E8 | Tripping of the DR2 distributed resource under normal EPS loading (Zs = j0.02 pu) with minimum PCC-bus loading (P = 0.3 pu, Q = 0.105 pu) | 0 |
| E9 | Tripping of the DR2 distributed resource under normal EPS loading (Zs = j0.02 pu) with maximum PCC-bus loading (P = 0.625 pu, Q = 0.22 pu) | 0 |
| E10 | Tripping of the DR2 distributed resource under minimum EPS loading (Zs = j0.05 pu) with normal PCC-bus loading (P = 0.5 pu, Q = 0.175 pu) | 0 |
| E11 | Tripping of the DR2 distributed resource under minimum EPS loading (Zs = j0.05 pu) with minimum PCC-bus loading (P = 0.3 pu, Q = 0.105 pu) | 0 |
| E12 | Tripping of the DR2 distributed resource under minimum EPS loading (Zs = j0.05 pu) with maximum PCC-bus loading (P = 0.625 pu, Q = 0.22 pu) | 0 |

TABLE 4

| System parameter | Threshold setting |
|---|---|
| V (voltage relay at cb-DR2) | 0.915 pu |
| f (frequency relay at cb-DR2) | 59.85 Hz |
| df/dt (rate-of-change of frequency at cb-DR2) | 2.09 Hz/sec |
| dP/dt (rate-of-change of power at cb-DR2) | 9.31 MW/sec |

TABLE 5

| System parameter | Threshold setting |
|---|---|
| V (voltage relay at cb-DR1) | 0.924 pu |
| f (frequency relay at cb-DR1) | 59.9 Hz |
| df/dt (rate-of-change of frequency at cb-DR1) | 2.155 Hz/sec |
| dP/dt (rate-of-change of power at cb-DR1) | 9.54 MW/sec |

What is claimed is:

1. A method comprising:
   providing a model for a predetermined location within an electrical power system having therein distributed resources (DR), the model based on known system conditions, the model indicative of first sensed characteristics of the electrical power system at the predetermined location;
   sensing at the predetermined location characteristics of the electrical power system corresponding to at least some of the first sensed characteristics;
   determining a status of the electrical power system network indicative of an islanding event in dependence upon sensing and other than in dependence upon other sensed data sensed remotely from the predetermined location;
   controlling a distributed resource in dependence upon the status;
   wherein forming the model comprises:
   providing a set of training events each training event within the set having a known outcome relating to islanding of the distributed resource;
   executing for each training event at least one of the electrical power system network and a simulation thereof to determine the first characteristics relating to the predetermined location for said training event;
   storing the first characteristics; and
   forming the model based on the stored first characteristics wherein the model comprises a decision tree based on the stored characteristics.

2. A method according to claim 1 wherein the decision tree is at least partially optimized to reduce a depth of the longest path therein.

3. A method according to claim 1 wherein the events comprise a number of training events greater than 17.

* * * * *